US012273885B2

(12) United States Patent
Huang et al.

(10) Patent No.: US 12,273,885 B2
(45) Date of Patent: Apr. 8, 2025

(54) RESOURCE ELEMENT MAPPING FOR MULTIPLEXING HIGH PRIORITY UPLINK CONTROL INFORMATION (UCI) AND LOW PRIORITY UCI IN A PHYSICAL UPLINK CONTROL CHANNEL

(71) Applicant: QUALCOMM Incorporated, San Diego, CA (US)

(72) Inventors: Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 413 days.

(21) Appl. No.: 17/662,833

(22) Filed: May 10, 2022

(65) Prior Publication Data

US 2022/0369348 A1    Nov. 17, 2022

Related U.S. Application Data

(60) Provisional application No. 63/187,339, filed on May 11, 2021.

(51) Int. Cl.
*H04W 72/21*   (2023.01)
*H04L 1/1607*   (2023.01)
(Continued)

(52) U.S. Cl.
CPC ........... *H04W 72/21* (2023.01); *H04L 1/1671* (2013.01); *H04W 72/23* (2023.01); *H04W 72/566* (2023.01)

(58) Field of Classification Search
CPC ... H04W 72/21; H04W 72/23; H04W 72/566; H04W 72/569; H04L 1/1671
(Continued)

(56) References Cited

U.S. PATENT DOCUMENTS

2019/0068423 A1   2/2019   Hwang et al.
2019/0230688 A1*  7/2019   Huang ................... H04L 5/001
(Continued)

FOREIGN PATENT DOCUMENTS

EP        3996312 A1    5/2022
WO     2021004316 A1    1/2021

OTHER PUBLICATIONS

International Search Report and Written Opinion—PCT/US2022/072265—ISA/EPO—Sep. 9, 2022.

*Primary Examiner* — Peter P Chau
(74) *Attorney, Agent, or Firm* — Patterson & Sheridan LLP

(57) ABSTRACT

Aspects of the present disclosure provide techniques for multiplexing high priority uplink control information (UCI) and low priority UCI on a physical uplink control channel (PUCCH). A method includes determining a total number of resource blocks to transmit encoded UCI bits based on a quantized payload size of a second one or more encoded UCI bits of a second priority and a non-quantized payload size of a first one or more encoded UCI bits of a first priority. The method generally includes mapping the second one or more encoded UCI bits to a first number of resource elements associated with the quantized payload size and the first one or more encoded UCI bits to a second number of REs and transmitting the encoded UCI bits in a PUCCH in accordance with the mapping.

30 Claims, 13 Drawing Sheets

(51) Int. Cl.
*H04W 72/23* (2023.01)
*H04W 72/566* (2023.01)

(58) Field of Classification Search
CPC ... H04L 1/0073; H04L 1/1614; H04L 5/0053; H04L 5/0094; H04L 1/1896; H04L 1/1854; H04L 1/1861; H04L 5/0055
See application file for complete search history.

(56) References Cited

U.S. PATENT DOCUMENTS

| | | | |
|---|---|---|---|
| 2019/0239216 A1* | 8/2019 | Kundu | H04W 72/21 |
| 2020/0267718 A1 | 8/2020 | Park et al. | |
| 2020/0295865 A1* | 9/2020 | Yang | H04B 7/0626 |
| 2022/0039088 A1* | 2/2022 | Zhang | H04W 72/21 |
| 2023/0284225 A1* | 9/2023 | Yin | H04L 1/1812 |
| | | | 370/329 |
| 2023/0345476 A1* | 10/2023 | Lin | H04W 72/566 |

\* cited by examiner

RESOURCE ELEMENT MAPPING FOR MULTIPLEXING HIGH PRIORITY UPLINK CONTROL INFORMATION (UCI) AND LOW PRIORITY UCI IN A PHYSICAL UPLINK CONTROL CHANNEL

CROSS-REFERENCE TO RELATED APPLICATION(S)

This application claims benefit of and priority to U.S. Provisional Application No. 63/187,339, filed May 11, 2021, which is hereby assigned to the assignee hereof and hereby expressly incorporated by reference herein in its entirety as if fully set forth below and for all applicable purposes.

INTRODUCTION

Field of the Disclosure

Aspects of the present disclosure relate to wireless communications, and more particularly, to techniques for multiplexing of high priority uplink control information (UCI) and low priority UCI in a physical uplink control channel (PUCCH).

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few.

These and other multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the long term evolution (LTE) mobile standard promulgated by the Third Generation Partnership Project (3GPP). NR is designed to better support mobile broadband Internet access by improving spectral efficiency, lowering costs, improving services, making use of new spectrum, and better integrating with other open standards.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects of the subject matter described in this disclosure can be implemented in a method for wireless communication by a user equipment (UE). The method generally includes obtaining encoded UCI bits comprising one or more encoded UCI bits of a first priority and one or more encoded UCI bits of a second priority. The second priority is different than the first priority. The method generally includes determining a total number of resource blocks (RBs) to transmit the encoded UCI bits. The determination of the total number of RBs to transmit the encoded UCI bits is based on a quantized payload size of the one or more encoded UCI bits of the second priority and a non-quantized payload size of the one or more encoded UCI bits of the first priority. The method generally includes mapping the one or more encoded UCI bits of the second priority to a first number of resource elements (REs), in a PUCCH resource, associated with the quantized payload size. The method generally includes mapping the one or more encoded UCI bits of the first priority to a second number of REs in the PUCCH resource. The method generally includes transmitting the one or more encoded UCI bits of the second priority in the first number of REs in the PUCCH and the one or more encoded UCI bits of the first priority in the second number of REs in the PUCCH resource.

Certain aspects of the subject matter described in this disclosure can be implemented in a method for wireless communication by a network entity. The method generally includes outputting an indication of a quantization parameter for a first type of UCI of a first priority. The method generally includes determining a total number of RBs to monitor a PUCCH transmission. Determining the total number of RBs to monitor the PUCCH transmission is based on an expected quantized payload size for the first type of UCI of the first priority and an expected non-quantized payload size of a second type of UCI of a second priority. The second priority is different than the first priority. The method generally includes monitoring the total number of RBs for the PUCCH transmission.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for multiplexing high priority UCI and low priority UCI in a PUCCH.

While aspects of the present disclosure are described with respect to an example of hybrid automatic repeat request (HARQ) feedback as UCI, the aspects described herein may apply to any type of UCI, such as scheduling requests (SRs) and channel state information (CSI) feedback.

UCI may be associated with different priorities. For example, different types of UCI (e.g., HARQ feedback, SR, CSI) may be associated with different relative priorities. Further, different UCI of the same UCI type may be associated with different relative priorities. In the example of HARQ feedback, HARQ feedback may be considered high priority (HP) HARQ feedback relative to other HARQ feedback considered as low priority (LP) HARQ feedback. In some example, the priority for HARQ feedback may be based on the type of traffic and/or the channel for which the HARQ feedback is being provided. For example, UCI providing HARQ feedback for a high priority traffic or channel may be considered HP UCI and UCI providing HARQ feedback for lower priority traffic or channel may be considered as LP UCI.

HP UCI and LP UCI may be separately encoded. The encoded HP UCI and LP UCI may then be multiplexed in a PUCCH. In some cases, there may be a difference in the payload size of the UCI transmitted by a UE and the UCI payload size expected at the network. This misalignment between the actual and expected UCI payload size may impact the resource element (RE) mapping of the UCI to the PUCCH resource, and may lead to the network entity failing to successfully decode the UCI.

Accordingly, aspects of the present disclosure provide for quantization of the encoded UCI and rounding up of the LP UCI payload size such that a number of resource blocks (RBs) used by the UE to transmit the multiplexed HP UCI and LP UCI matches the number of RBs the network expects for the multiplexed UCI. In addition, to guarantee frequency diversity of the HP UCI, the UE may perform the RE mapping of the HP UCI to frequency distributed REs in the PUCCH.

Example Wireless Communications Network

Figure 1:
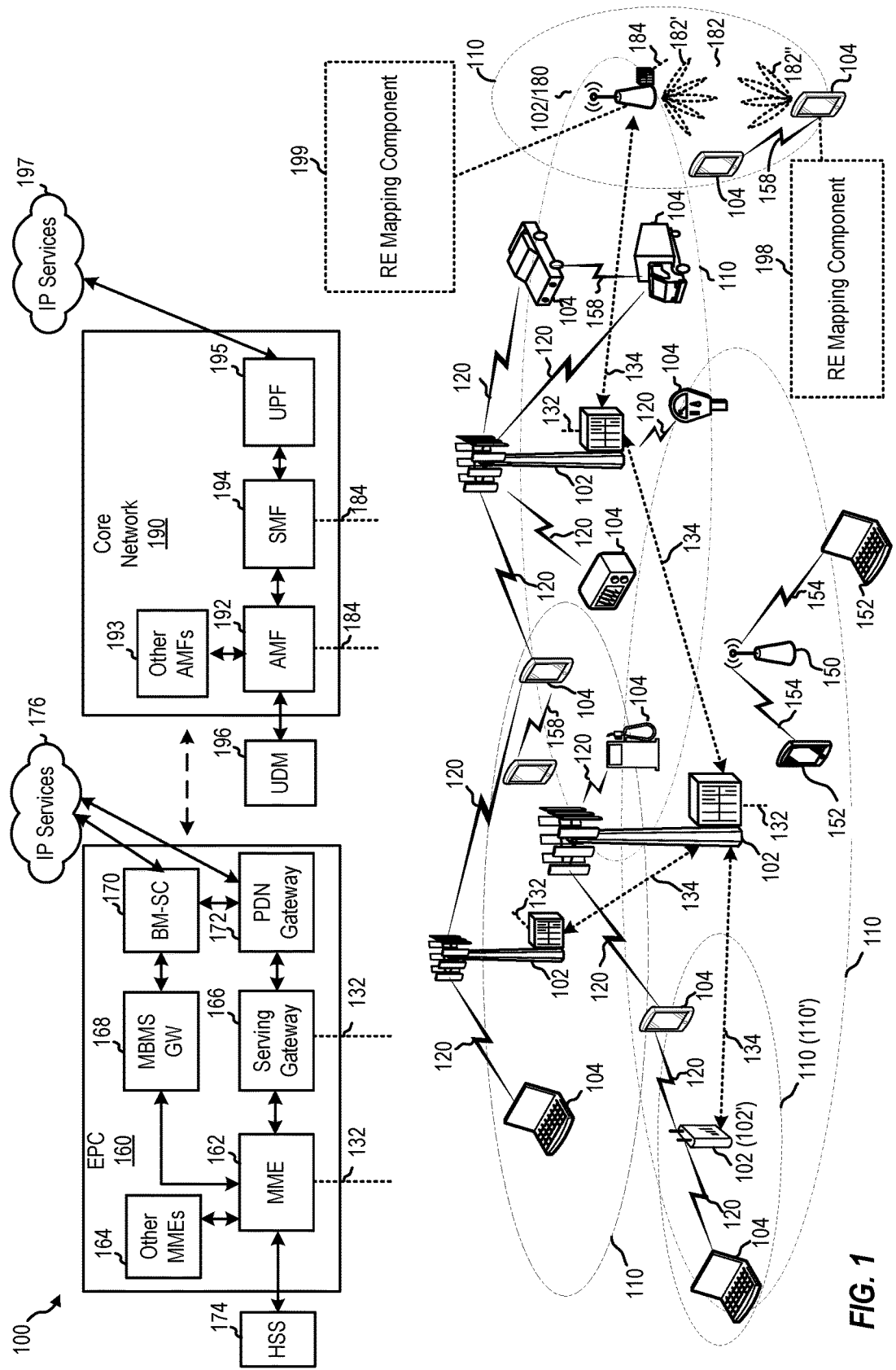
FIG. 1 is a block diagram conceptually illustrating an example wireless communication network.

FIG. 1 depicts an example of a wireless communications network 100, in which aspects described herein may be implemented. Wireless communication network 100 may be a 5G NR network).

Generally, wireless communications network 100 includes BSs 102, UEs 104, an Evolved Packet Core (EPC) 160, and core network 190 (e.g., a 5G Core (5GC)), which interoperate to provide wireless communications services.

BSs 102 may provide an access point to the EPC 160 and/or to core network 190 for a user equipment 104. BSs 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. BSs 102 may include and/or be referred to as a next generation Node B (gNB), a Node B, an evolved Node B (eNB), an access point (AP), a base transceiver station (BTS), a radio base station, a radio transceiver, a transceiver function, or a transmit reception point (TRP) in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power BS) may have a coverage area 110' that overlaps the coverage area 110 of one or more macrocells (e.g., high-power BSs).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. Communication links 120 may use multiple-input multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal (MT), a wireless terminal, a remote terminal, a handset, a user agent, a mobile client, or a client.

According to certain aspects, BSs 102 and UEs 104 may be configured for multiplexing separately coded HP UCI and LP UCI on PUCCH. As shown in FIG. 1, the BS 102 includes a RE mapping component 199 that may be configured in accordance with aspects of the present disclosure. For example, RE mapping component 199 may be configured to perform the operations 1000 illustrated in FIG. 10. UE 104 includes a RE mapping component 198 that may be configured in accordance with aspects of the present disclosure. For example, RE mapping component 198 may perform the operations 900 illustrated in FIG. 9.

Figure 2:
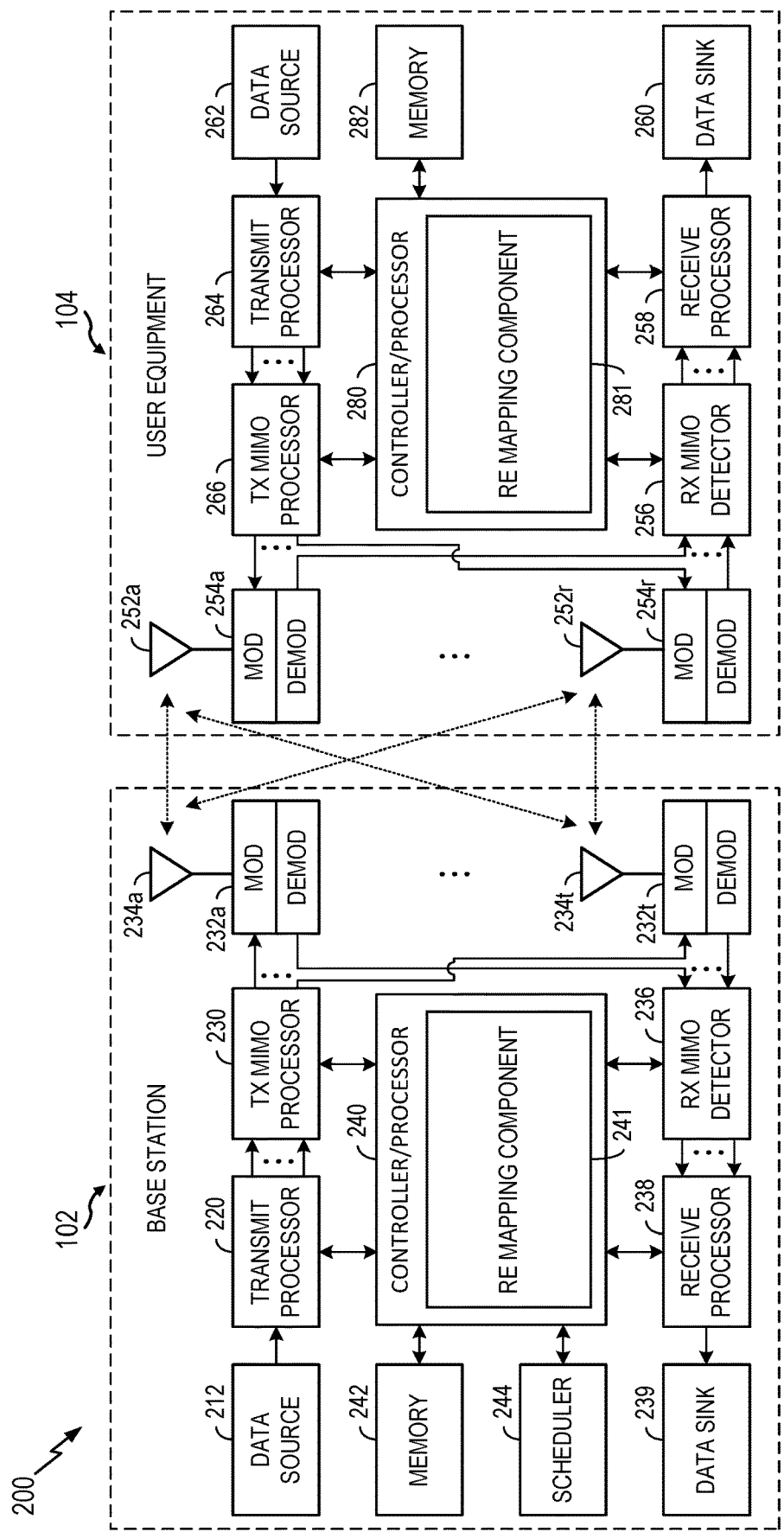
FIG. 2 is a block diagram conceptually illustrating aspects of an example base station (BS) and an example UE.

FIG. 2 depicts aspects of an example BS 102 and UE 104.

Generally, BS 102 includes various processors (e.g., 220, 230, 238, and 240), antennas 234a-t (collectively 234), transceivers 232a-t (collectively 232) which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes RE mapping component 241, which may be representative of RE mapping component 199 of FIG. 1. Notably, while depicted as an aspect of controller/processor 240, RE mapping component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes RE mapping component 281, which may be representative of RE mapping component 198 of FIG. 1. Notably, while depicted as an aspect of controller/processor 280, RE mapping component 281 may be implemented additionally or alternatively in various other aspects of user equipment 104 in other implementations.

In various aspects, a network entity or network node can be implemented as an aggregated base station, as a disaggregated base station, a component of a base station, an integrated access and backhaul (IAB) node, a relay node, a sidelink node, to name a few examples.

Figure 3:
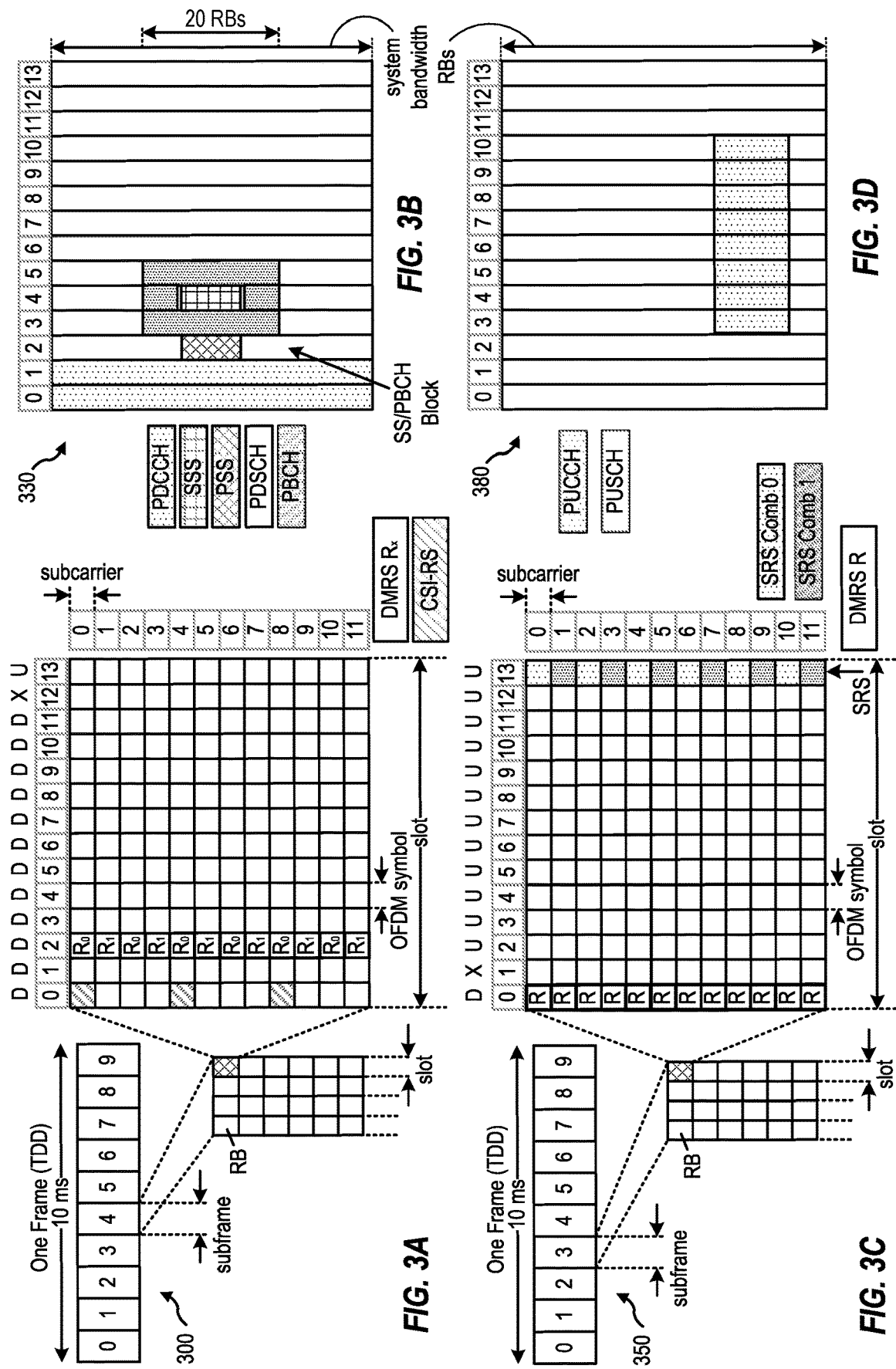
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example UCI Multiplexing

A UE (e.g., such as a UE 104 in wireless communications network 100 illustrated in FIG. 1) may have UCI to send, such as to a base station (e.g., a BS 102 in wireless communications network 100 illustrated in FIG. 1). The UCI may include scheduling requests, CSI feedback, and/or HARQ feedback (e.g., also referred to as HARQ ACK feedback). Different types of UCI may be multiplexed in a PUCCH. For example, high priority HARQ feedback may be multiplexed in the PUCCH with low priority HARQ feedback. High priority UCI may refer to UCI having a higher priority relative to the low priority UCI. The priorities of the UCI may be determined by the UE, indicated by the network, or specified in a wireless standard (e.g., a 3GPP technical standard). The priority of HARQ feedback may be associated with the type of traffic or the channel for which the HARQ feedback is being provided.

Figure 4:
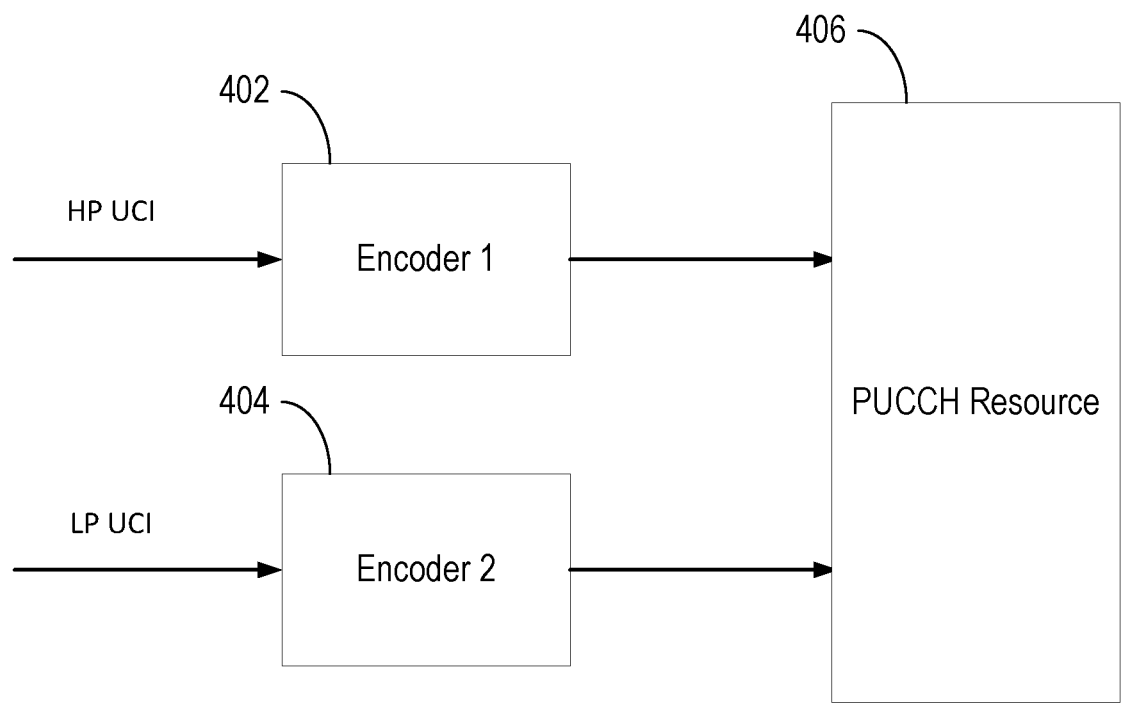
FIG. 4 illustrates an example of separate encoding and mapping to a PUCCH of high priority UCI and low priority UCI.

In some cases, such as when the total number of UCI bits is more than two bits, the UCI feedback may be coded separately. For example, as shown in FIG. 4, the UE may encode HP UCI using a first encoder 402 and separately encode the LP UCI using a second encoder 404. The encoded UCI bits are then mapped to a PUCCH resource 406. In some cases, when HP HARQ bits and LP HARQ bits are multiplexed on a PUCCH, CSI that would otherwise multiplex on the PUCCH may be dropped.

Figure 5:
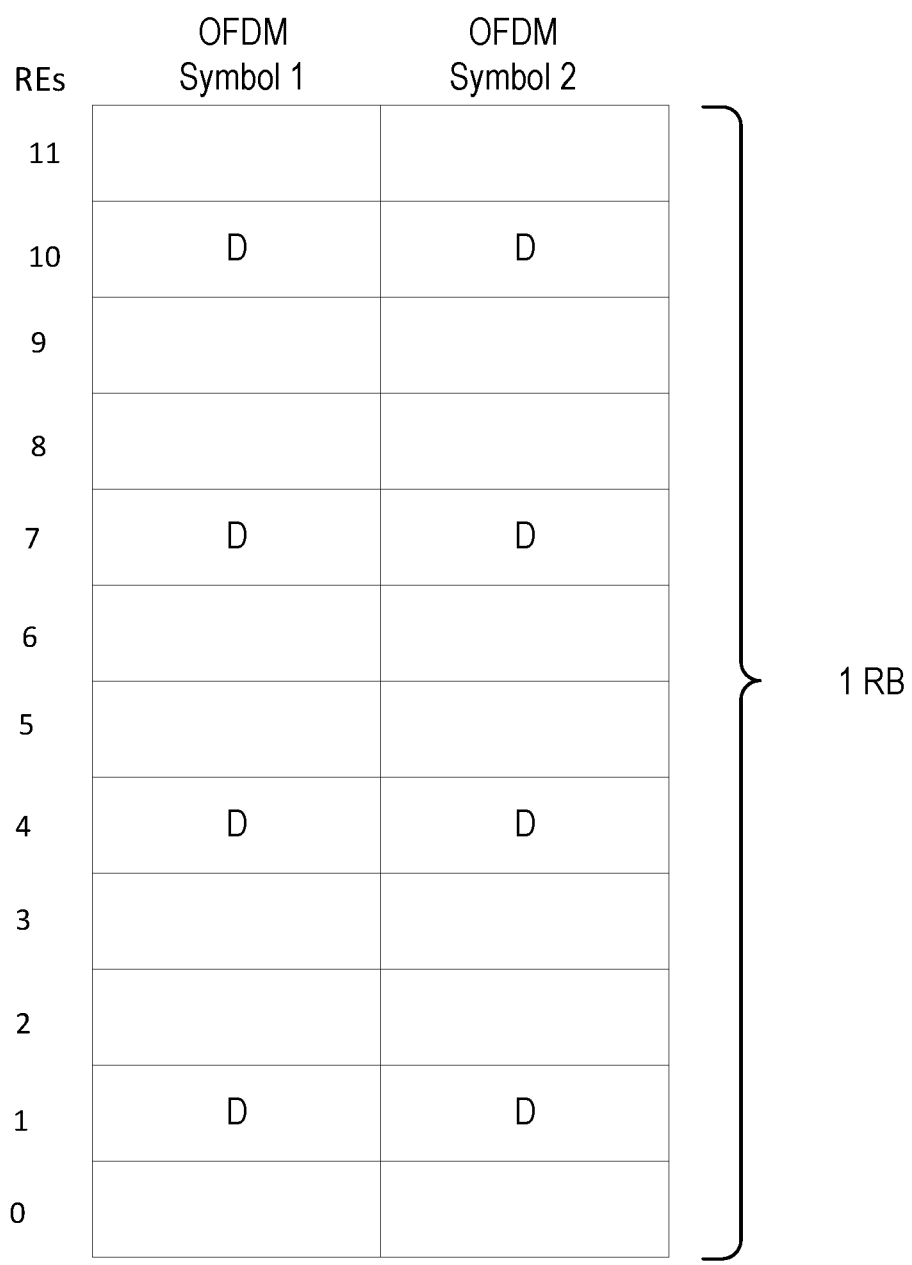
FIG. 5 illustrates an example PUCCH format.

FIG. 5 illustrates an example PUCCH format 500, in accordance with certain aspects of the present disclosure. In some cases, the example PUCCH format 500 may be a PUCCH format 2. In some examples, the PUCCH format may contain 1 or 2 orthogonal frequency division multiplexing (OFDM) symbols. As shown, the example PUCCH format 500 includes two OFDM symbols—OFDM symbol 1 and OFDM symbol 2. While the example PUCCH format 500 illustrates the format for 1 RB, the example PUCCH format 500 may include up to 16 RBs in the frequency domain. As shown, in one RB, the example PUCCH format 500 may include twelve frequency tones. Some of the tones may be tones reserved for demodulation reference signal (DMRS) transmission. In the example PUCCH format 500, tones 1, 4, 7, and 10 are DMRS tones. The DMRS pattern may repeated on the second OFDM symbol (if present), as shown in FIG. 5.

Figure 6:
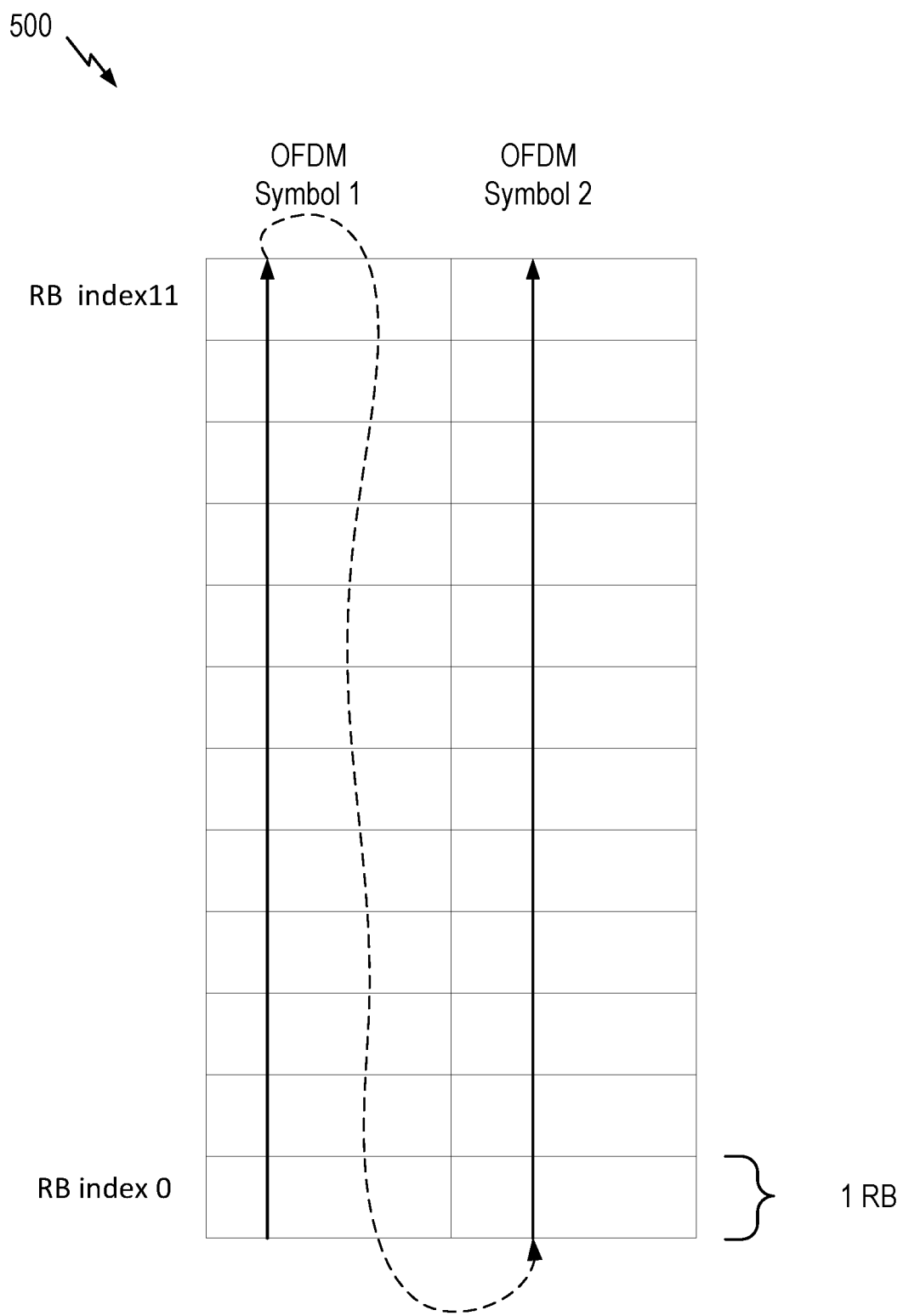
FIG. 6 illustrates an example mapping of high priority UCI and low priority UCI to a PUCCH.

In some systems, such as 5G NR Release 15 systems, the encoded UCI bits are mapped to the PUCCH resource in a frequency first, time second mapping. For example, the UCI bits may be mapped first to fill all of the available REs (e.g., excluding the DMRS tones) of the PUCCH resource RBs in the first OFDM symbol and then to fill the available REs in the PUCCH resource RBs in the second OFDM system. As shown in FIG. 6, with a frequency first, time second, mapping, the mapping may start from the lowest RE index of the lowest RB index in the first (e.g., earliest) OFDM symbol, and continuing mapping tone-by-tone within the first OFDM symbol, and then continuing the tone-by-tone mapping starting from the lowest RE index of the lowest RB index in the next OFDM symbol (if present).

Figure 7A:
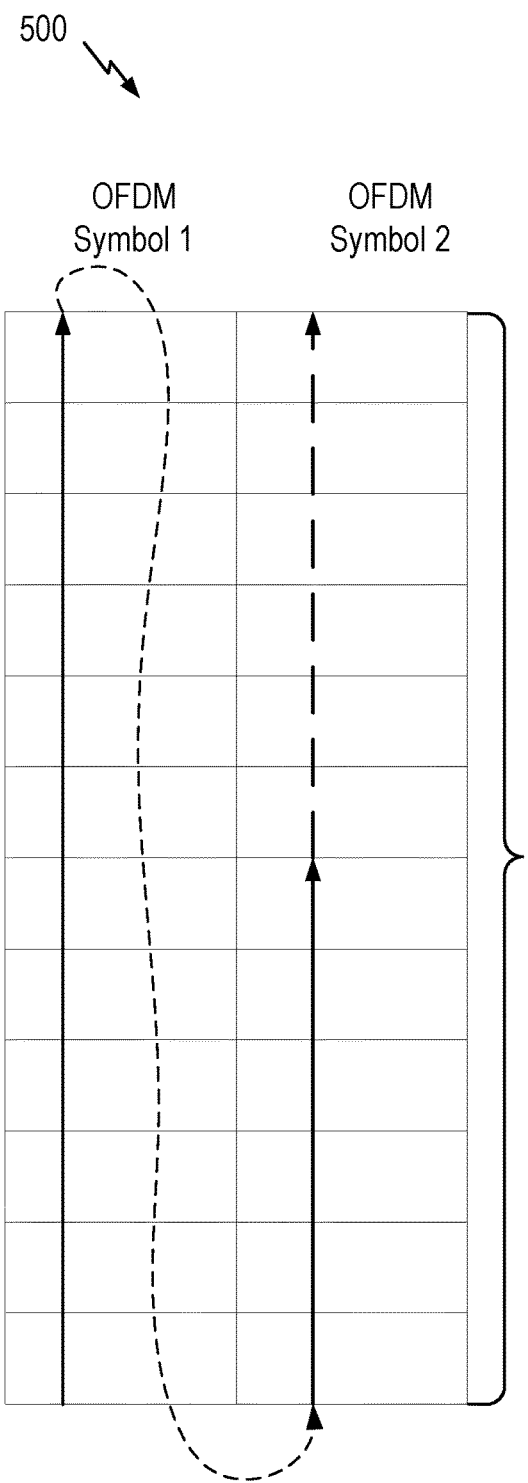
FIGS. 7A-7B illustrates an example low priority UCI size misalignment between an expected mapping of high priority UCI and low priority UCI to a PUCCH in FIG. 7A and an actual mapping of the high priority UCI and the low priority UCI to the PUCCH in FIG. 7B.
Figure 7B:
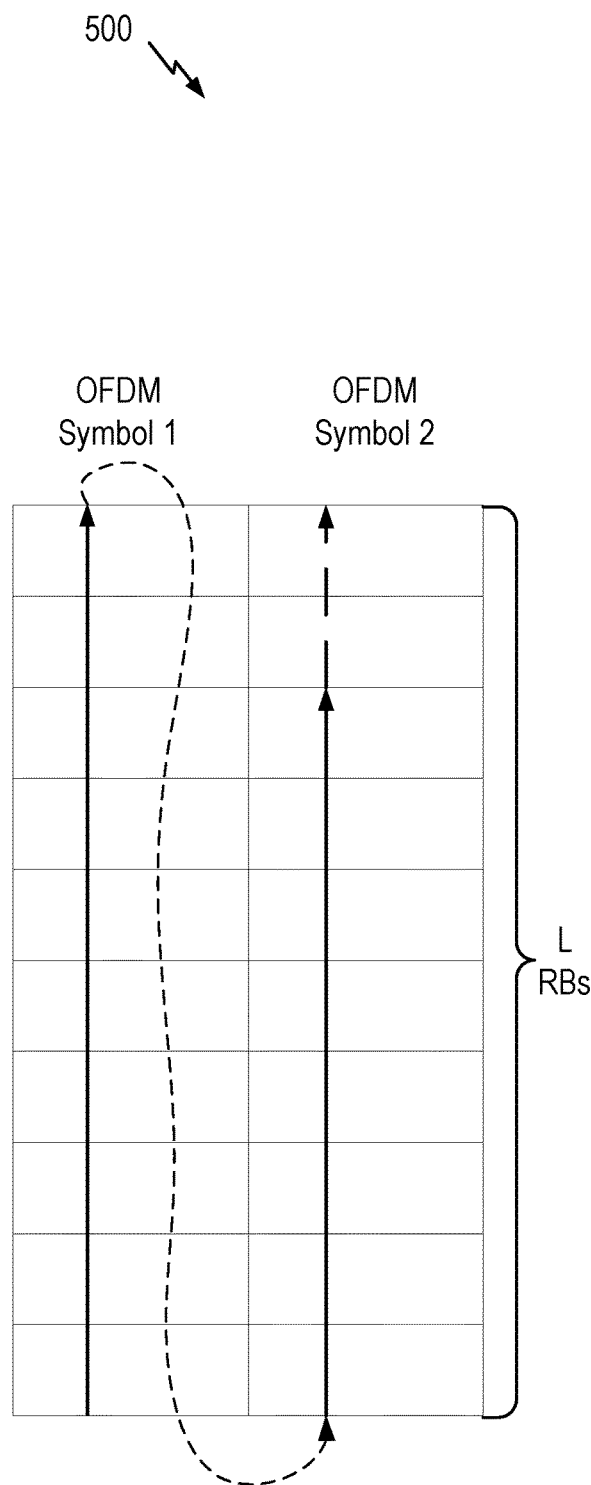

When multiplexing HP UCI and LP UCI in the PUCCH, the frequency first, time second, RE mapping may lead to misalignment and UCI decoding failure at the BS. FIGS. 7A and 7B illustrates an example mapping of HP UCI and LP UCI to a PUCCH with a low priority UCI size misalignment between a UE and a BS, in accordance with certain aspects of the present disclosure.

FIG. 7A illustrates example expected UCI feedback by the BS. In the example shown in FIG. 7A, the BS expects K bits HP UCI feedback and M bits LP UCI feedback. Based on the expected K+M feedback bits, the BS expects L' RBs for the UCI payload according to the frequency first, time second RE, mapping, shown in FIG. 7A.

In some cases, high priority DCI (associated with HP UCI) may be sent with higher power and lower aggregation level than lower priority DCI (associated with LP UCI) and, thus, it may be more likely that low priority DCI is missed. The UE may miss one or more DCI carrying one or more downlink grants scheduling PDSCH. When the UE misses the downlink grant, the UE does not provide HARQ feedback for the associated PDSCH, although the network scheduled the PDSCH and there expects UCI feedback for the PDSCH. This leads to a difference in the size of the UCI payload actually transmitted by the UE and size of the UCI payload expected by the network.

The UE provides K bits HP UCI feedback and N bits LP UCI feedback, where the N bits LP UCI feedback provided by the UE are fewer than the M bits LP UCI feedback expected by the network (e.g., due to a missed DL grant). Based on the K+N feedback bits, the UE provides L RBs for the UCI payload according to the frequency first, time second, RE mapping as shown in the example in FIG. 7B. As shown in FIG. 7B, the L RBs provided by the UE are fewer than the L' RBs expected by the BS in FIG. 7A. Thus, as shown in FIGS. 7A and 7B, there is misalignment between the RE mapping performed by the UE and the RE mapping expected by the network. This may cause the network entity to fail in decoding the UCI transmitted by the UE. For example, the network entity may attempt to decode the L' RBs and will decode some noise RBs and may also consider the HP UCI to end at a different RB than it actually does.

Accordingly, what is needed are techniques and apparatus for RE mapping for multiplexing HP UCI and LP UCI in a PUCCH.

Example Resource Element Mapping for Multiplexing High and Low Priority Uplink Control Information on a Physical Uplink Control Channel Aspects of the present disclosure provide techniques and apparatus for multiplexing UCI in a PUCCH. Aspects provide RE mapping of multiplexed UCI in a PUCCH. The UCI may include high priority UCI and low priority UCI. The UCI may include SR, CSI, and/or HARQ feedback. In some examples, the HARQ feedback may include HP HARQ ACK bits and LP HARQ ACK bits.

The UCI of different priorities may be separately coded. In some examples, the UE encodes the HP HARQ ACK bits using a first encoder and the LP HARQ ACK bits are encoded using a second encoder. The UE the maps the encoded UCI bits to REs of the PUCCH.

The RE mapping may include mapping the UCI bits to a quantized payload size. According to certain aspects, the UE maps the LP UCI to a quantized payload size, such that the RE mapping of the UCI performed by the UE matches an RE mapping expected by a network entity for the UCI. In addition, the UCI payload size in the PUCCH transmitted by the UE matches a UCI payload size expected by the network entity. As discussed in more detail below, the RE mapping may be performed such that even when the UE misses one or more downlink grants scheduling PDSCH transmission, the RE mapping of the UCI transmitted by the UE matches the RE mapping of the UCI expected by the network entity.

Although some aspects of the disclosure are described with respect to RE mapping for HP UCI and LP UCI in an example PUCCH format 2, the techniques described herein may be applied to other PUCCH formats.

Based on downlink grants the UE receives from the network entity, the UE has an actual amount of UCI payload to send to the network entity. As discussed above, the network entity expects a UCI payload, which may be based on the downlink grants sent by the network entity to the UE. As discussed above, however, the actual UCI payload that the UE has to send may be less than the UCI payload size expected by the network entity when the UE misses one or more of the downlink grants sent by the BS.

According to certain aspects, the UE maps the LP UCI to a quantized LP payload size. Similarly, the network entity can determine an expected mapping of the LP UCI to the quantized LP payload size. According to certain aspects, the UE may "round up" the actual LP UCI payload size to a reference payload size. The network entity also round up the expected LP UCI payload size to the reference payload size. In some examples, the network entity sends the UE a quantization granularity, q (e.g., q=4). Referring back to the example above, the network entity expects M bits LP UCI, but the UE has N<M LP UCI bits to send. According to certain aspects, the UE can determine the quantized (or reference) LP payload size, N', as:

$$N'=\text{ceil}(N/q)*q \qquad \text{Eq. 1}$$

The network determine a quantized LP payload size, N', as:

$$N'=\text{ceil}(M/q)*q \qquad \text{Eq. 2}$$

Using the Eqs. 1-2, the N bits UCI the UE has to send and the M bits expected by the BS both quantize to the same value N'.

The UE also has K bits HP UCI to multiplex with the LP UCI bits. The total number of RBs, L. the UE uses in the RE mapping to send the UCI is based on the K bits HP UCI and the N' quantized LP UCI bits. For example, the UE may determine L as:

$$L=\text{ceil}((K/r_{HP}+N'/r_{LP})/\text{mod\_order}/S/D) \qquad \text{Eq. 3,}$$

In Eq. 3, nip (r_HP) is the coding rate for the HP UCI bits, N' is the quantized LP UCI payload size, $r_{LP}$ ($r_{LP}$) is the coding rate for the LP UCI bits, mod_order is the modulation order for the PUCCH transmission, S is the number of OFDM symbols (e.g., 1 or 2) in the PUCCH resource, and D is the number of available tones for UCI in one RB (e.g., the total number of tones in the RB minus the number of tones in the RB dedicated for DMRS). The network entity can also determine an expected total number of RBs, L, to monitor using the Eq. 3. $r_{HP}$ and $r_{LP}$ may be configured at the UE by the network.

Because the UE and the network entity both round to the same value of N', the number of RBs (L) used by the UE for transmitting the UCI is the same as the number of RBs expected and monitored by the network entity for the UCI. Accordingly, the network entity can successfully decode the UCI from the UE.

According to certain aspects, the UE performs a distributed RE mapping of the HP UCI in the frequency domain to ensure frequency diversity for the HP UCI. The UE may perform the distributed RE mapping to spread the HP UCI as wide as possible over the frequency domain in the PUCCH resource.

Figure 8:
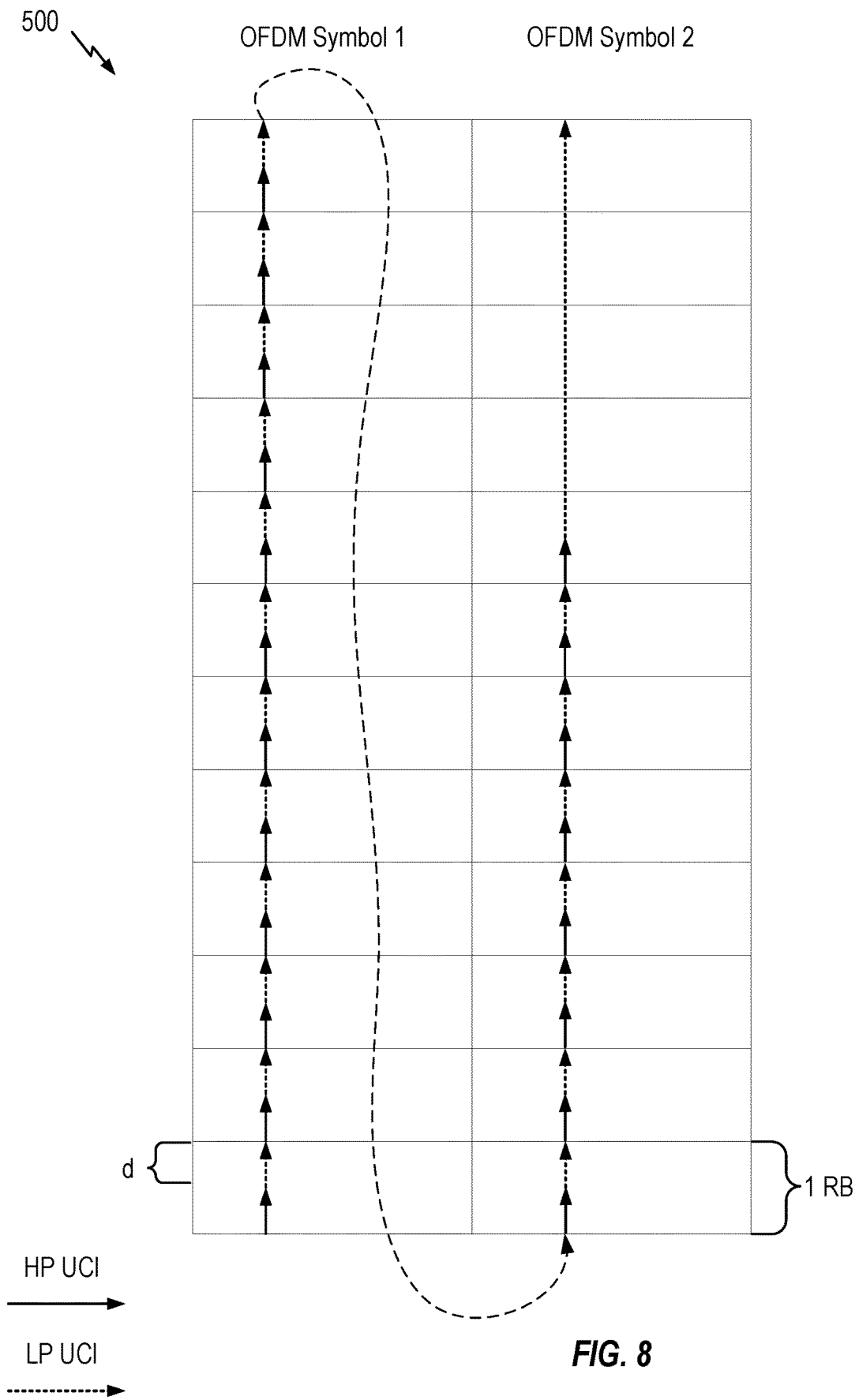
FIG. 8 illustrates an example frequency distributed mapping of high priority UCI and low priority UCI to a PUCCH.

FIG. 8 illustrates an example frequency distributed mapping of high priority UCI and low priority UCI to the PUCCH format 500, in accordance with certain aspects of the present disclosure.

As shown in FIG. 8, the HP UCI is frequency distributed across the RBs of the PUCCH. In the example shown, the UE maps the HP UCI in a frequency first, time second manner with a distance, d, between mapped REs. The HP UCI may be distributed with the distance, d, between HP UCI bits or sets of HP UCI bits with d REs between mapped REs or sets of mapped REs. The distance, d, between HP UCI mapped REs may be based on the quantized LP UCI payload size. For example, the UE may determine the distance as:

$$d = \text{floor}(S*D*L*\text{mod\_order}*r_{HP}/K) \quad \text{Eq. 4,}$$

where L can be determined from the Eqs. 1 and 3 above. The network entity can also determine an expected mapping of the HP UCI using the Eqs. 2-4.

The LP UCI may be mapped to the remaining REs in the PUCCH resource. Because the actual LP UCI payload size, N, is quantized to the reference payload size N', and N<N', the number of remaining REs may more than needed for N. Thus, there may still be remaining REs in the PUCCH after mapping both the HP UCI and the LP UCI. The UE may performing encoding and rate matching for the LP UCI payload using all of the remaining REs after the HP UCI mapping, which may results in a lower coding rate than the coding rate, $r_{LP}$, configured by the network.

Example User Equipment Operations

Figure 9:
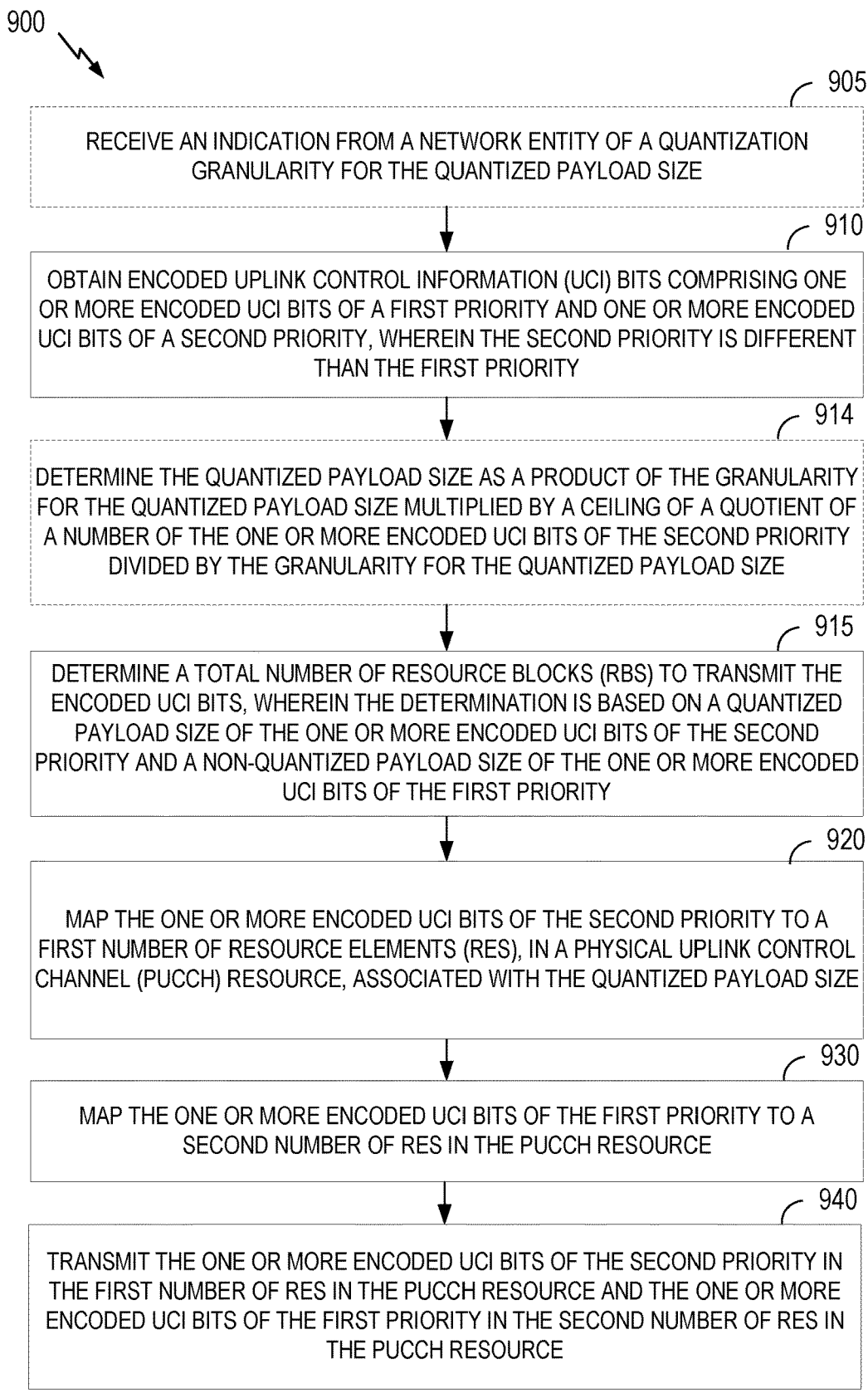
FIG. 9 is a flow diagram illustrating example operations for wireless communication by a UE.

FIG. 9 is a flow diagram illustrating example operations 900 for wireless communication, in accordance with certain aspects of the present disclosure. The operations 900 may be performed, for example, by a UE (such as a UE 104 in the wireless communication network 100). The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

In some examples, at block 905, the UE may receive an indication from a network entity of a quantization granularity for a quantized payload size.

The operations 900 may begin, at block 910, by obtaining encoded UCI bits comprising one or more encoded UCI bits of a first priority and one or more encoded UCI bits of a second priority. The second priority is different than the first priority. The one or more encoded UCI bits of the first priority may be one or more encoded UCI bits of a type associated with a higher priority than the one or more encoded UCI bits of the second priority. The one or more encoded UCI bits of the first priority may be one or more encoded HARQ bits of the first priority and the one or more encoded UCI bits of the second priority may include one or more encoded HARQ bits of the second priority. The first priority of the one or more encoded HARQ bits and the second priority of the one or more encoded HARQ bits may be based on a type of traffic associated with the HARQ bits.

In some examples, at block 910, the UE may determine the quantized payload size of the one or more encoded UCI bits of the second priority by round up an actual payload size of the one or more encoded UCI bits of the second priority to the quantized payload size. Round up of the actual payload size may include determining a product of the granularity for the quantized payload size multiplied by a ceiling of a quotient of a number of the one or more encoded UCI bits of the second priority divided by the granularity for the quantized payload size.

At 915, the UE may determine a total number of RBs to transmit the encoded UCI bits. The determination of the total number of RBs to transmit the encoded UCI bits is based on a quantized payload size of the one or more encoded UCI bits of the second priority and a non-quantized payload size of the one or more encoded UCI bits of the first priority. Determining the total number of RBs to transmit the encoded UCI bits may include determining a ceiling of a quotient of a first sum divided by a second quotient. The first sum may be a sum of a third quotient and a fourth quotient. The third quotient may be a quotient of the number of the one or more encoded UCI bits of the first priority divided by a first coding rate for the one or more encoded UCI bits of the first priority and the fourth quotient may be a quotient of the determined quantized payload size divided by a second coding rate for the one or more encoded UCI bits of the second priority. The second quotient may be a quotient of a modulation order of the PUCCH transmission divided by a number of OFDM symbols in the PUCCH divided by a number of available tones for encoded UCI bits of the first priority in one RB.

At 920, the UE may map the one or more encoded UCI bits of the second priority to a first number of REs, in a PUCCH resource, associated with the quantized payload size.

At 930, the UE may map the one or more encoded UCI bits of the first priority to a second number of REs in the PUCCH resource.

Mapping the one or more encoded UCI bits of the first priority may include mapping the one or more encoded UCI bits of the first priority to frequency distributed REs of the PUCCH. The UE may determine a distance between each of the distributed REs mapped to encoded UCI bits of the first priority based on the quantized payload size.

Determining the distance between each of the distributed REs mapping to encoded UCI bits of the first priority may include determining a floor or a ceiling of a quotient of a product of a number of OFDM symbols in the PUCCH multiplied by a number of available tones for encoded UCI bits of the first priority in one RB, multiplied by the determined total number of RBs to transmit the encoded UCI bits, multiplied by a modulation order of the PUCCH transmission, multiplied by a coding rate for the one or more encoded UCI bits of the first priority divided by a number of the one or more encoded UCI bits of the first priority.

Mapping the one or more encoded UCI bits of the second priority may include mapping the one or more encoded UCI bits of the second priority to remaining REs in the PUCCH after mapping the one or more encoded UCI bits of the first priority.

Operations 900 may include performing coding and rate matching for the UCI bits of the second priority using all of the remaining REs in the PUCCH after mapping the one or more encoded UCI bits of the first priority.

At 940, the UE may transmit the one or more encoded UCI bits of the second priority in the first number of REs in the PUCCH resource and the one or more encoded UCI bits of the first priority in the second number of REs in the PUCCH resource. The PUCCH may be a PUCCH format 2.

Example Network Entity Operations

Figure 10:
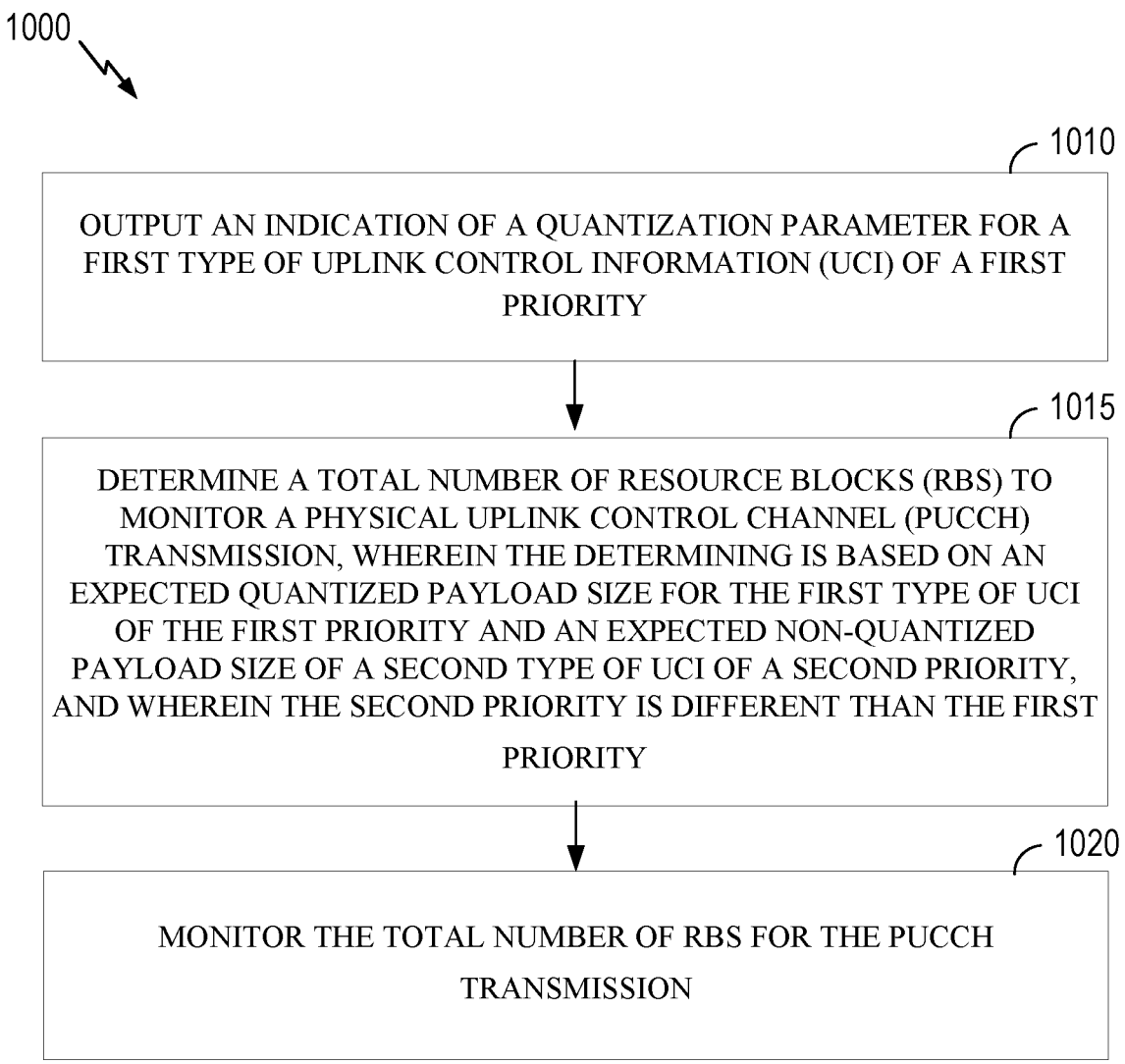
FIG. 10 is a flow diagram illustrating example operations for wireless communication by a network entity.

FIG. 10 is a flow diagram illustrating example operations 1000 for wireless communication, in accordance with certain aspects of the present disclosure. The operations 1000 may be performed, for example, by a network entity (e.g., such as a BS 102 in the wireless communication network 100). The operations 1000 may be complementary to the operations 900 performed by the UE. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at block 1010, by outputting an indication of a quantization parameter for a first type of UCI of a first priority.

At 1020, the network entity determining a total number of RBs to monitor a PUCCH transmission. Determining the total number of RBs to monitor the PUCCH transmission is based on an expected quantized payload size for the first type of UCI of the first priority and an expected non-quantized payload size of a second type of UCI of a second priority. The second priority is different than the first priority.

At 1030, the network entity monitors the total number of RBs for the PUCCH transmission.

Example System Operations

Figure 11:
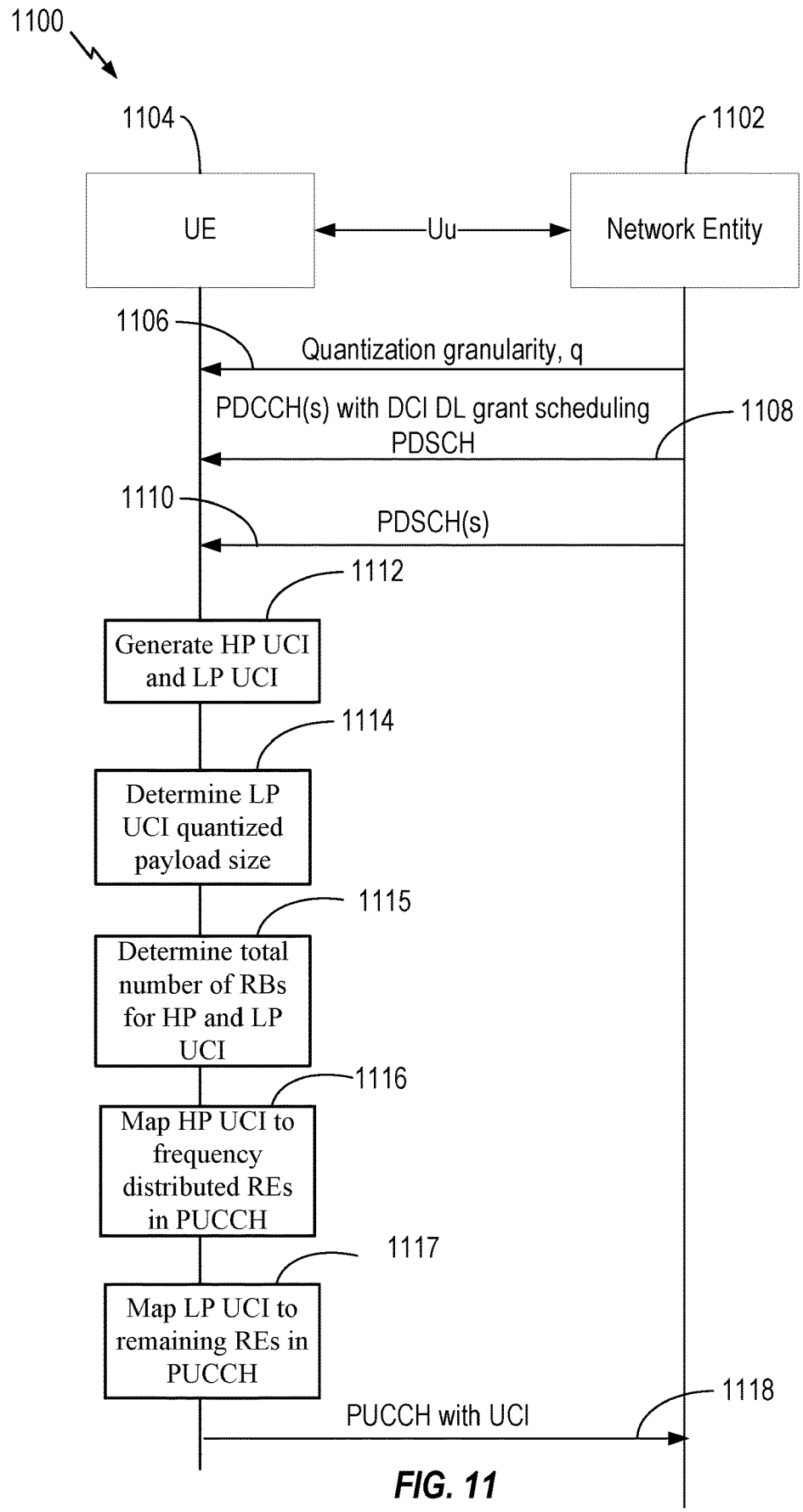
FIG. 11 is a call flow diagram illustrating example signaling for high and low priority UCI mapping.

FIG. 11 is a call flow diagram illustrating example signaling 1100 for high and low priority UCI mapping, in accordance with aspects of the present disclosure.

As shown in FIG. 11, at 1106, UE 1104 may receive a quantization granularity, q, from network entity 1102.

At 1108, UE 1104 may receive one or more DCI with one or more DL grants in one or more PDCCH transmissions that schedule one or more PDSCH transmissions.

At 1110, UE 1104 may monitor the one or more PDSCH transmissions.

At 1112, UE 1104 may generate HP UCI and LP UCI based on the monitoring of the one or more PDSCH transmissions.

UE 1104 may have an actual number of UCI bits based on the number of received downlink grants, which may be fewer than the number of the one or more downlink grants transmitted by network entity 1102 (e.g., when UE 1104 missed one or more of the downlink grants).

At 1114, UE 1104 determines the LP quantized payload size. For example, UE 1104 can determine the LP UCI quantized payload size based on the Eq. 1, the quantization granularity, q, signaled at 1106, and the one or more DL grants received by UE 1104 at 1108. Network entity 1102 can also determine the LP UCI quantized payload size based on the Eq. 2, the quantization granularity, q, signaled at 1106, and the one or more DL grants transmitted by network entity 1102 at 1108.

At 1115, UE 1104 may determine a total number of RBs for providing the HP UCI and the LP UCI. For example, UE 1104 may determine the total number of RBs, L, based on the Eq. 3 and the LP UCI quantized payload size determined at 1114. Network entity 1102 may determine an expected total number of RBs to monitor for the HP UCI and the LP UCI based on the Eq. 3 and the LP UCI quantized payload size determined at 1114.

At 1116, UE 1104 maps the HP UCI to frequency distributed REs in a PUCCH resource. For example UE 1104 may map the HP UCI to frequency distributed REs with a distance, d, determined based on the Eq. 4, in a frequency first, time second, RE mapping starting with a lowest RE index and RB index in an earliest OFDM symbol of the PUCCH resource, excluding frequency tones dedicated for DMRS. Network entity 1102 can also determine an expected mapping for the HP UCI based on the Eq. 4, in a frequency first, time second, RE mapping starting with a lowest RE index and RB index in an earliest OFDM symbol of the PUCCH resource, excluding frequency tones dedicated for DMRS.

At 1117, UE 1104 maps the LP UCI to remaining REs in the PUCCH resource. Network entity 1102 can determine an expected mapping of the LP UCI, mapping the LP UCI to the remaining REs in the PUCCH resource.

At 1118, UE 1104 sends the PUCCH transmission with the multiplexed HP UCI and LP UCI according to the determined RE mapping and the total number of RBs. Network entity 1102 monitors PUCCH according to the determined RE mapping in the in expected number of RBs.

Example Communications Device

Figure 12:
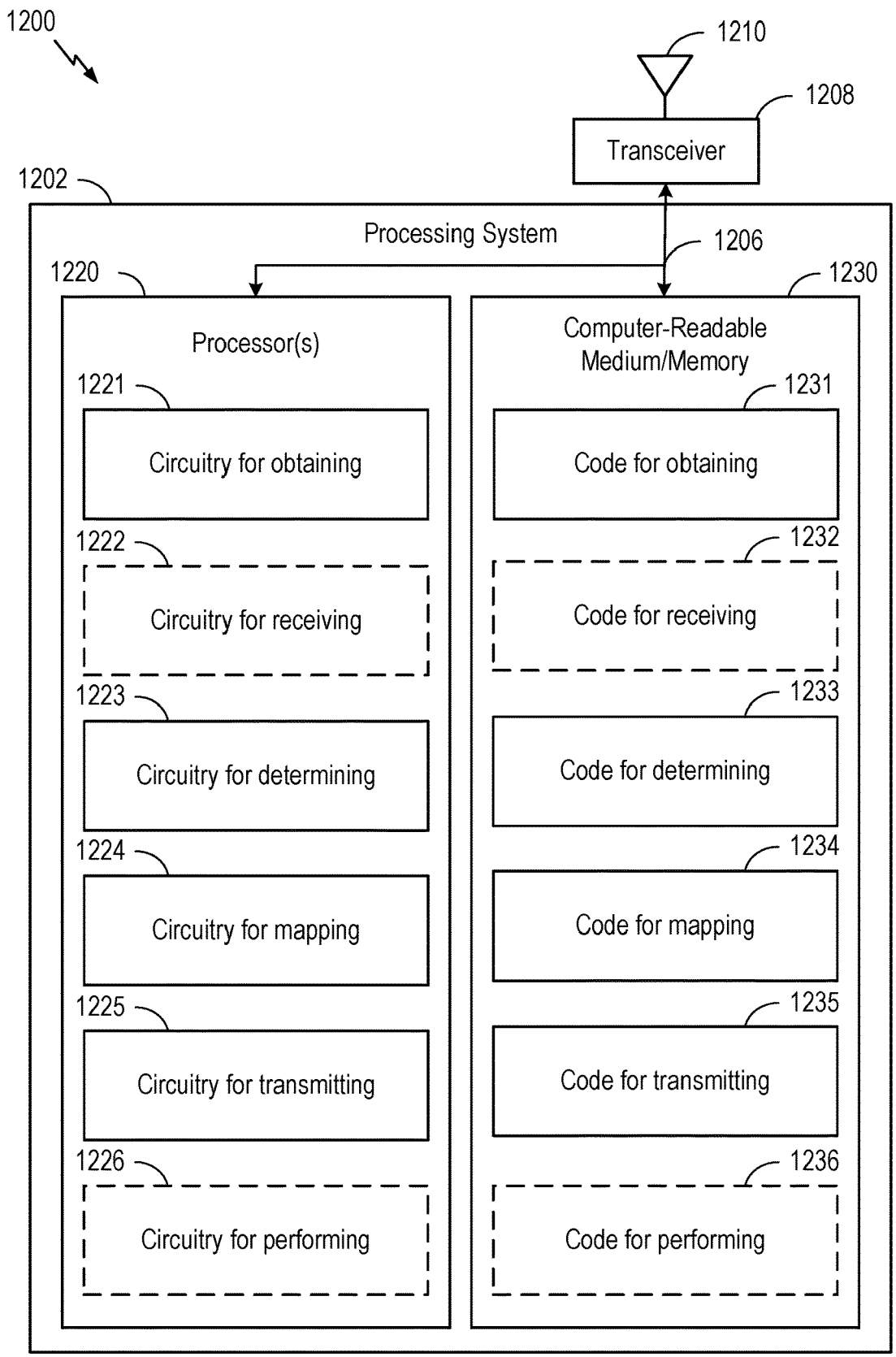
FIG. 12 illustrates an example communications device.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor(s) 1220 coupled to a computer-readable medium/memory 1230 via a bus 1206. In certain aspects, the computer-readable medium/memory 1230 is configured to store instructions (e.g., computer-executable code) that when executed by the processor(s) 1220, cause the processor(s) 1220 to perform the operations illustrated in FIG. 8, or other operations for performing the various techniques discussed herein for RE mapping for HP UCI and LP UCI multiplexed in PUCCH. In certain aspects, computer-readable medium/memory 1230 stores code 1231 for obtaining; code 1232 for receiving; code 1233 for determining; code 1234 for mapping; code 1235 for transmitting; and/or code 1236 for performing. In certain aspects, the processor(s) 1220 has circuitry configured to implement the code stored in the computer-readable medium/memory 1230. The processor(s) 1220 includes circuitry 1221 for obtaining; circuitry 1222 for receiving; circuitry 1223 for determining; circuitry 1224 for mapping; circuitry 1225 for transmitting; and/or circuitry 1226 for performing.

Figure 13:
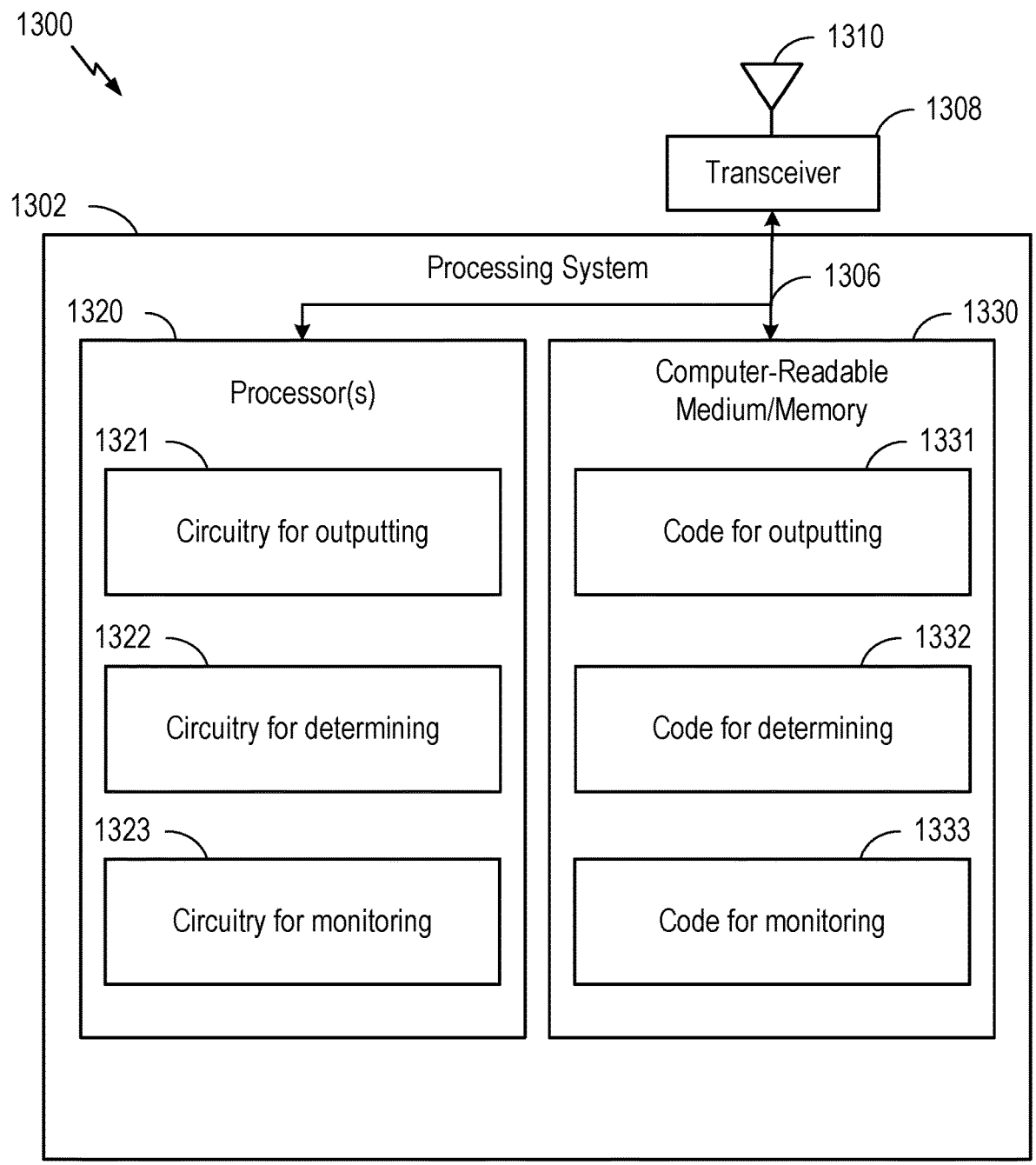
FIG. 13 illustrates another example communications device.

FIG. 13 illustrates a communications device 1300 that may include various components (e.g., corresponding to means-plus-function components) configured to perform operations for the techniques disclosed herein, such as the operations illustrated in FIG. 10. The communications device 1300 includes a processing system 1302 coupled to a transceiver 1308 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor(s) 1320 coupled to a computer-readable medium/memory 1330 via a bus 1306. In certain aspects, the computer-readable medium/memory 1330 is configured to store instructions (e.g., computer-executable code) that when executed by the processor(s) 1320, cause the processor(s) 1320 to perform the operations illustrated in FIG. 10, or other operations for performing the various techniques discussed herein for RE mapping for HP UCI and LP UCI multiplexed in PUCCH. In certain aspects, computer-readable medium/memory 1330 stores code 1331 for signaling; code 1332 for determining; and code 1333 for monitoring. In certain aspects, the processor(s) 1320 has circuitry configured to implement the code stored in the computer-readable medium/memory 1330. The processor(s) 1320 includes circuitry 1321 for signaling; circuitry 1322 for determining; and circuitry 1323 for monitoring.

Aspects describes herein may avoid misalignment of UCI RBs sent by the UE and UCI RBs expected by the BS leading to increased UCI decoding efficiency at the receiver of the UCI. Frequency diversity of UCI may be improved by the frequency tone distribution of the UCI in the RE mapping.

Example Aspects

In addition to the various aspects described above, the aspects can be combined. Some specific combinations of aspects are detailed below:

Aspect 1. A method for wireless communication by a user equipment (UE), comprising: obtaining encoded uplink control information (UCI) bits comprising one or more encoded UCI bits of a first priority and one or more encoded UCI bits of a second priority; determining a total number of resource blocks (RBs) to transmit the encoded UCI bits based on a quantized payload size of the one or more encoded UCI bits of the second priority and a non-quantized payload size of the one or more encoded UCI bits of the first priority; mapping the one or more encoded UCI bits of the second priority to a first number of resource elements (REs) associated with the quantized payload size and the one or more encoded UCI bits of the first priority to a second number of REs; and transmitting the encoded UCI bits in a physical uplink control channel (PUCCH) in accordance with the mapping.

Aspect 2. The method of aspect 1, wherein the one or more encoded UCI bits of the first priority comprise one or more encoded UCI bits of a type associated with a higher priority than the one or more encoded UCI bits of the second priority.

Aspect 3. The method of any of aspects 1-2, further comprising receiving an indication from a network entity of a quantization granularity for the quantized payload size.

Aspect 4. The method of any of aspects 1-3, further comprising determining the quantized payload size of the one or more encoded UCI bits of the second priority by round up an actual payload size of the one or more encoded UCI bits of the second priority to the quantized payload size.

Aspect 5. The method of aspect 4, wherein round up of the actual payload size comprises determining a product of the granularity for the quantized payload size multiplied by a ceiling of a quotient of a number of the one or more encoded UCI bits of the second priority divided by the granularity for the quantized payload size.

Aspect 6. The method of any of aspects 4-5, wherein determining the total number of RBs to transmit the encoded UCI bits comprises determining a ceiling of a quotient of a first sum divided by a second quotient, wherein the first sum is a sum of a third quotient and a fourth quotient, wherein the third quotient is a quotient of the number of the one or more encoded UCI bits of the first priority divided by a first coding rate for the one or more encoded UCI bits of the first priority and the fourth quotient is a quotient of the determined quantized payload size divided by a second coding rate for the one or more encoded UCI bits of the second priority, and wherein the second quotient is a quotient of a modulation order of the PUCCH transmission divided by a number of orthogonal frequency division multiplexing (OFDM) symbols in the PUCCH divided by a number of available tones for encoded UCI bits of the first priority in one RB.

Aspect 7. The method of any of aspects 4-6, wherein mapping the one or more encoded UCI bits of the first priority comprises mapping the one or more encoded UCI bits of the first priority to frequency distributed REs of the PUCCH.

Aspect 8. The method of aspect 7, further comprising determining a distance between each of the distributed REs mapped to encoded UCI bits of the first priority based on the quantized payload size.

Aspect 9. The method of aspect 8, wherein determining the distance between each of the distributed REs mapping to encoded UCI bits of the first priority comprises determining a floor of a quotient of a product of a number of orthogonal frequency division multiplexing (OFDM) symbols in the PUCCH multiplied by a number of available tones for encoded UCI bits of the first priority in one RB, multiplied by the determined total number of RBs to transmit the encoded UCI bits, multiplied by a modulation order of the PUCCH transmission, multiplied by a coding rate for the one or more encoded UCI bits of the first priority divided by a number of the one or more encoded UCI bits of the first priority.

Aspect 10. The method of any of aspects 8-9, wherein determining the distance between each of the distributed REs mapping to encoded UCI bits of the first priority comprises determining a ceiling of a quotient of a product of a number of orthogonal frequency division multiplexing (OFDM) symbols in the PUCCH multiplied by a number of available tones for encoded UCI bits of the first priority in one RB, multiplied by the determined total number of RBs to transmit the encoded UCI bits, multiplied by a modulation order of the PUCCH transmission, multiplied by a coding rate for the one or more encoded UCI bits of the first priority divided by a number of the one or more encoded UCI bits of the first priority.

Aspect 11. The method of any of aspects 1-10, wherein mapping the one or more encoded UCI bits of the second priority comprises mapping the one or more encoded UCI bits of the second priority to remaining REs in the PUCCH after mapping the one or more encoded UCI bits of the first priority.

Aspect 12. The method of any of aspects 1-11, further comprising performing coding and rate matching for the UCI bits of the second priority using all of the remaining REs in the PUCCH after mapping the one or more encoded UCI bits of the first priority.

Aspect 13. The method of any of aspects 1-12, wherein the one or more encoded UCI bits of the first priority comprise one or more encoded hybrid automatic repeat request (HARQ) bits of the first priority and the one or more encoded UCI bits of the second priority comprises one or more encoded HARQ bits of the second priority.

Aspect 14. The method of aspect 13, wherein the first priority of the one or more encoded HARQ bits and the second priority of the one or more encoded HARQ bits are based on a type of traffic associated with the HARQ bits.

Aspect 15. The method of any of aspects 1-14, wherein the PUCCH comprises a PUCCH format 2.

Aspect 16. A method for wireless communication by a network entity, comprising: signaling, to a user equipment (UE), an indication of a parameter to use for quantizing a payload for a first type of uplink control information (UCI) with a first priority when sent by the UE in a same physical uplink control channel (PUCCH) as a second type of UCI with a second priority; determining a total number of resource blocks (RBs) to monitor encoded UCI bits based on an expected quantized payload size with the first type of UCI of the first priority and an expected non-quantized payload size of the second type of UCI with the second priority; and monitoring the expected total number of RBs for a PUCCH containing encoded bits of the first type of UCI, in the expected quantized payload in accordance with the indication, and encoded bits of the second type of UCI in the expected non-quantized payload.

Aspect 17. The method of aspect 16, further comprising: determining an expected mapping of one or more expected encoded UCI bits of the first type of UCI with the first priority to a first number of resource elements (REs) associated with the quantized payload size and one or more expected encoded UCI bits of the second type of UCI with the second priority to a second number of REs.

Aspect 18. The method of aspect 17, wherein second priority is a higher priority than the first priority.

Aspect 19. The method of any of aspects 16-18, further comprising determining the quantized payload size of the one or more encoded UCI bits of the first type with the first priority by round up an expected payload size of the one or more encoded UCI bits of the first type with the first priority to the quantized payload size.

Aspect 20. The method of aspect 19, wherein the expected payload size of the one or more encoded UCI bits of the first type with the first priority is based on one or more downlink grants scheduling transmitted by the network entity scheduling one or more transmissions by the network entity associated with UCI of the first type.

Aspect 21. The method of aspect 19, wherein determining the quantized payload size comprises determining a product of the granularity for the quantized payload size multiplied by a ceiling of a quotient of a number of the one or more expected encoded UCI bits of the first type with the first priority divided by the granularity for the quantized payload size.

Aspect 22. The method of aspect 19, wherein determining the expected total number of RBs to monitor encoded UCI bits comprises determining a ceiling of a quotient of a first sum divided by a second quotient, wherein the first sum is a sum of a third quotient and a fourth quotient, wherein the third quotient is a quotient of the number of the one or more expected encoded UCI bits of the second type with the second priority divided by a second coding rate for the one or more expected encoded UCI bits of the second type with the second priority and the fourth quotient is a quotient of the determined quantized payload size divided by a first coding rate for the one or more expected encoded UCI bits of the first type with the first priority, and wherein the second quotient is a quotient of a modulation order of the PUCCH divided by a number of orthogonal frequency division multiplexing (OFDM) symbols in the PUCCH divided by a number of available tones for encoded UCI bits of the second type with the second priority in one RB.

Aspect 23. The method of aspect 22, wherein the number of the one or more expected UCI bits of the second type with the second priority is based on one or more downlink grants transmitted by the network entity scheduling one or more transmissions by the network entity associated with UCI of the second type.

Aspect 24. The method of any of aspects 17-23, wherein determining the expected mapping of the one or more encoded UCI bits of the second type with the second priority comprises determining an expected mapping the one or more expected encoded UCI bits of the second type with the second priority to frequency distributed resource elements (REs) of the PUCCH.

Aspect 25. The method of aspect 24, further comprising determining a distance between each of the distributed REs mapped to expected encoded UCI bits of the second type with the second priority based on the quantized payload size.

Aspect 26. The method of aspect 25, wherein determining the distance between each of the distributed REs mapping to encoded UCI bits of the second type with the second priority comprises determining a floor of a quotient of a product of a number of orthogonal frequency division multiplexing (OFDM) symbols in the PUCCH multiplied by a number of available tones for expected encoded UCI bits of the second type with the second priority in one RB, multiplied by the expected total number of RBs, multiplied by a modulation order of the PUCCH transmission, multiplied by a coding rate for the one or more expected encoded UCI bits of the second type with the second priority divided by a number of the one or more expected encoded UCI bits of the second type with the second priority.

Aspect 27. The method of aspect 25, wherein determining the distance between each of the distributed REs mapping to encoded UCI bits of the second type with the second priority comprises determining a ceiling of a quotient of a product of a number of orthogonal frequency division multiplexing (OFDM) symbols in the PUCCH multiplied by a number of available tones for expected encoded UCI bits of the second type with the second priority in one RB, multiplied by the expected total number of RBs, multiplied by a modulation order of the PUCCH transmission, multiplied by a coding rate for the one or more expected encoded UCI bits of the second type with the second priority divided by a number of the one or more expected encoded UCI bits of the second type with the second priority.

Aspect 28. The method of any of aspects 24-27, wherein determining the expected mapping the one or more expected encoded UCI bits of the first type with the first priority comprises determining the expected mapping the one or more expected encoded UCI bits of the first type with the first priority to remaining REs in the PUCCH.

Aspect 29. The method of any of aspects 16-28, wherein the one or more encoded expected UCI bits of the first type with the first priority comprise one or more encoded hybrid automatic repeat request (HARQ) bits of the first priority and the one or more expected encoded UCI bits of the second type with the second priority comprises one or more encoded HARQ bits of the second priority.

Aspect 30. The method of aspect 29, wherein the first priority of the one or more encoded HARQ bits and the second priority of the one or more encoded HARQ bits are based on a type of traffic associated with the HARQ bits.

Aspect 31. The method of any of aspects 16-30, wherein the PUCCH comprises a PUCCH format 2.

Aspect 32. A method for wireless communication by a user equipment (UE), the method comprising: obtaining encoded uplink control information (UCI) bits comprising one or more encoded UCI bits of a first priority and one or more encoded UCI bits of a second priority, wherein the second priority is different than the first priority; determining a total number of resource blocks (RBs) to transmit the encoded UCI bits, wherein the determination is based on a quantized payload size of the one or more encoded UCI bits of the second priority and a non-quantized payload size of the one or more encoded UCI bits of the first priority; mapping the one or more encoded UCI bits of the second priority to a first number of resource elements (REs), in a physical uplink control channel (PUCCH) resource, associated with the quantized payload size; mapping the one or more encoded UCI bits of the first priority to a second number of REs in the PUCCH resource; and transmitting the one or more encoded UCI bits of the second priority in the first number of REs in the PUCCH resource and the one or more encoded UCI bits of the first priority in the second number of REs in the PUCCH resource.

Aspect 33. The method of aspect 32, wherein: the one or more encoded UCI bits of the first priority comprise one or more encoded UCI bits of a first type; the one or more encoded UCI bits of the second priority comprise one or more encoded UCI bits of a second type; and the first priority is a higher priority than the second priority.

Aspect 34. The method of any one or more of aspects 32-33, further comprising receiving an indication from a network entity of a quantization granularity for the quantized payload size.

Aspect 35. The method of any one or more of aspects 32-34, further comprising determining the quantized payload size of the one or more encoded UCI bits of the second priority, wherein the determining includes rounding up an actual payload size of the one or more encoded UCI bits of the second priority to the quantized payload size.

Aspect 36. The method of any one or more of aspects 32-35, wherein mapping the one or more encoded UCI bits of the first priority comprises mapping the one or more encoded UCI bits of the first priority to frequency distributed REs of the PUCCH resource.

Aspect 37. The method of aspect 36, further comprising determining a frequency distance between each of the frequency distributed REs mapped to encoded UCI bits of the first priority based on the quantized payload size of the one or more encoded UCI bits of the second priority.

Aspect 38. The method of any one or more of aspects 32-37, wherein mapping the one or more encoded UCI bits of the second priority to the first number of REs in the PUCCH resources comprises mapping the one or more encoded UCI bits of the second priority to remaining REs in the PUCCH resource after mapping the one or more encoded UCI bits of the first priority to the second number of REs.

Aspect 39. The method of aspect 38, further comprising performing coding and rate matching for the one or more encoded UCI bits of the second priority using all remaining REs in the PUCCH.

Aspect 40. The method of any one or more of aspects 32-39, wherein the one or more encoded UCI bits of the first priority comprise one or more encoded hybrid automatic repeat request (HARQ) feedback bits of the first priority and the one or more encoded UCI bits of the second priority comprises one or more encoded HARQ feedback bits of the second priority.

Aspect 41. The method of any one or more of aspects 32-40, wherein the first priority is based on a first type of traffic or a first type of channel, and wherein the second priority is based on a second type of traffic or a second type of channel.

Aspect 42. The method of any one or more of aspects 32-41, wherein the PUCCH comprises a PUCCH format 2.

Aspect 43. The method of any one or more of aspects 32-42, wherein mapping the one or more encoded UCI bits of the second priority and mapping the one or more encoded UCI bits of the first priority comprises mapping the encoded UCI bits tone by tone starting from a lowest tone index in an earliest orthogonal frequency division multiplexing (OFDM) symbol of the PUCCH resource.

Aspect 44. A method for wireless communication by a network entity, comprising: outputting an indication of a quantization parameter for a first type of uplink control information (UCI) of a first priority; determining a total number of resource blocks (RBs) to monitor a physical uplink control channel (PUCCH) transmission, wherein the determining is based on an expected quantized payload size for the first type of UCI of the first priority and an expected non-quantized payload size of a second type of UCI of a second priority, and wherein the second priority is different than the first priority; and monitoring the total number of RBs for the PUCCH transmission.

Aspect 45. The method of aspect 44, further comprising: determining an expected mapping of one or more expected encoded UCI bits of the first type of UCI of the first priority to a first number of resource elements (REs) in the PUCCH transmission, wherein the first number of REs is associated with the expected quantized payload size for the first type of UCI; and determining an expected mapping of one or more expected encoded UCI bits of the second type of UCI of the second priority to a second number of REs in the PUCCH transmission.

Aspect 46. The method of aspect 45, wherein determining the expected mapping of the one or more expected encoded UCI bits of the second type of UCI of the second priority comprises determining an expected mapping the one or more expected encoded UCI bits of the second type of UCI of the second priority to frequency distributed REs in the PUCCH transmission.

Aspect 47. The method of aspect 46, further comprising: determining a frequency distance between each of the frequency distributed REs mapped to expected encoded UCI bits of the second type of UCI of the second priority, wherein determining the frequency distance is based on the expected quantized payload size.

Aspect 48. The method of any one or more of aspects 45-47, wherein determining the expected mapping the one or more expected encoded UCI bits of the first type of UCI of the first priority comprises determining the expected mapping of the one or more expected encoded UCI bits of the first type of UCI of the first priority to remaining REs in the PUCCH transmission after determining the expected mapping of the one or more encoded UCI bits of the first type of UCI of the first priority to the second number of REs.

Aspect 49. The method of any one or more of aspects 44-48, wherein the second priority is a higher priority than the first priority.

Aspect 50. The method of any one or more of aspects 44-48, further comprising: determining the expected quantized payload size for one or more encoded UCI bits of the first type of UCI of the first priority, wherein determining the expected quantized payload size includes rounding up an expected payload size of the one or more encoded UCI bits of the first type of UCI of the first priority to the quantized payload size based on the quantization parameter.

Aspect 51. The method of aspect 50, further comprising: outputting one or more downlink grants scheduling one or more downlink transmissions by the network entity associated with the first type of UCI of the first priority; and determining the expected payload size of the one or more encoded UCI bits of the first type of UCI of the first priority based on the one or more downlink grants.

Aspect 52. The method of any one or more of aspects 44-51, further comprising: outputting one or more downlink grants scheduling one or more downlink transmissions by the network entity associated with the second type of UCI of the second priority; and determining a number of the one or more expected UCI bits of the second type of UCI of the second priority based on the one or more downlink grants.

Aspect 53. The method of any one or more of aspects 44-52, wherein: the one or more expected encoded UCI bits of the first type of UCI of the first priority comprise one or more encoded hybrid automatic repeat request (HARQ) bits of the first priority; and the one or more expected encoded UCI bits of the second type of UCI of the second priority comprises one or more encoded HARQ bits of the second priority.

Aspect 54. The method of any one or more of aspects 44-53, wherein: the first priority is based on a first type of traffic or a first type of channel; and the second priority is based on a second type of traffic or a second type of channel.

Aspect 55. The method of claim 44-54, wherein the PUCCH transmission comprises a PUCCH format 2 transmission.

Aspect 56. An apparatus comprising means for performing the method of any of aspects 1 through 55.

Aspect 57. An apparatus comprising at least one processor and a memory coupled to the at least one processor, the memory comprising code executable by the at least one processor to cause the apparatus to perform the method of any of aspects 1 through 55.

Aspect 58. A computer readable medium storing computer executable code thereon for wireless communications that, when executed by at least one processor, cause an apparatus to perform the method of any of aspects 1 through 58.

Additional Wireless Communication Network Aspects

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, BS 180 may utilize beamforming 182 with the UE 104 to improve path loss and range. To do so, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements. In addition, these service may co-exist in the same subframe.

Returning to FIG. 1, various aspects of the present disclosure may be performed within the example wireless communications network 100.

In 3GPP, the term "cell" can refer to a coverage area of a Node B (NB) and/or a NB subsystem serving this coverage area, depending on the context in which the term is used. A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. ABS for a femto cell may be referred to as a femto BS or a home BS.

BS 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with core network 190 through second backhaul links 184. BSs 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some BSs, such as BS 180 may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave BS.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers (CCs) may include a primary component carrier (PCC) and one or more secondary component carriers (SCCs). A PCC may be referred to as a primary cell (PCell) and a SCC may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the PUSCH) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be TDD, in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing (SCS) and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The PDSCH carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the PUCCH and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries UCI, such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of RE mapping for multiplexed high priority UCI and low priority UCI to a PUCCH in communication systems. The preceding description is provided to enable any person skilled in the art to practice the various aspects described herein. Various modifications to these aspects will be readily apparent to those skilled in the art, and the generic principles defined herein may be applied to other aspects. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, a graphics processing unit (GPU), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 9 and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communication by a user equipment (UE), the method comprising:
obtaining encoded uplink control information (UCI) bits comprising one or more encoded UCI bits of a first priority and one or more encoded UCI bits of a second priority, wherein the second priority is different than the first priority;
determining a total number of resource blocks (RBs) to transmit the encoded UCI bits, wherein the determination is based on a quantized payload size of the one or more encoded UCI bits of the second priority and a non-quantized payload size of the one or more encoded UCI bits of the first priority;
mapping the one or more encoded UCI bits of the second priority to a first number of resource elements (REs), in a physical uplink control channel (PUCCH) resource, associated with the quantized payload size;
mapping the one or more encoded UCI bits of the first priority to a second number of REs in the PUCCH resource; and
transmitting the one or more encoded UCI bits of the second priority in the first number of REs in the PUCCH resource and the one or more encoded UCI bits of the first priority in the second number of REs in the PUCCH resource.

2. The method of claim 1, wherein:
the one or more encoded UCI bits of the first priority comprise one or more encoded UCI bits of a first type;
the one or more encoded UCI bits of the second priority comprise one or more encoded UCI bits of a second type; and
the first priority is a higher priority than the second priority.

3. The method of claim 1, further comprising receiving an indication from a network entity of a quantization granularity for the quantized payload size.

4. The method of claim 1, further comprising determining the quantized payload size of the one or more encoded UCI bits of the second priority, wherein the determining the quantized payload size includes rounding up an actual payload size of the one or more encoded UCI bits of the second priority to the quantized payload size.

5. The method of claim 1, wherein the mapping of the one or more encoded UCI bits of the first priority comprises mapping the one or more encoded UCI bits of the first priority to frequency distributed REs of the PUCCH resource.

6. The method of claim 5, further comprising determining a frequency distance between each of the frequency distributed REs mapped to the one or more encoded UCI bits of the first priority based on the quantized payload size of the one or more encoded UCI bits of the second priority.

7. The method of claim 1, wherein the mapping of the one or more encoded UCI bits of the second priority to the first number of REs in the PUCCH resources comprises mapping the one or more encoded UCI bits of the second priority to remaining REs in the PUCCH resource after the mapping of the one or more encoded UCI bits of the first priority to the second number of REs.

8. The method of claim 7, further comprising performing coding and rate matching for the one or more encoded UCI bits of the second priority using all remaining REs in the PUCCH resource.

9. The method of claim 1, wherein the one or more encoded UCI bits of the first priority comprise one or more encoded hybrid automatic repeat request (HARQ) feedback bits of the first priority and the one or more encoded UCI bits of the second priority comprises one or more encoded HARQ feedback bits of the second priority.

10. The method of claim 1, wherein the first priority is based on a first type of traffic or a first type of channel, and wherein the second priority is based on a second type of traffic or a second type of channel.

11. The method of claim 1, wherein the PUCCH resource comprises a PUCCH format 2.

12. The method of claim 1, wherein the mapping of the one or more encoded UCI bits of the second priority and the mapping of the one or more encoded UCI bits of the first priority each comprises mapping the respective one or more encoded UCI bits tone by tone starting from a lowest tone index in an earliest orthogonal frequency division multiplexing (OFDM) symbol of the PUCCH resource.

13. An apparatus for wireless communication, the apparatus comprising:
at least one processor; and
a memory coupled to the at least one processor, the memory comprising code executable by the at least one processor to cause the apparatus to:
obtain encoded uplink control information (UCI) bits comprising one or more encoded UCI bits of a first priority and one or more encoded UCI bits of a second priority, wherein the second priority is different than the first priority;

determine a total number of resource blocks (RBs) to transmit the encoded UCI bits, wherein the determination is based on a quantized payload size of the one or more encoded UCI bits of the second priority and a non-quantized payload size of the one or more encoded UCI bits of the first priority;

map the one or more encoded UCI bits of the second priority to a first number of resource elements (REs), in a physical uplink control channel (PUCCH) resource, associated with the quantized payload size;

map the one or more encoded UCI bits of the first priority to a second number of REs in the PUCCH resource; and transmit the one or more encoded UCI bits of the second priority in the first number of REs in the PUCCH resource and the one or more encoded UCI bits of the first priority in the second number of REs in the PUCCH resource.

14. The apparatus of claim 13, wherein:
the one or more encoded UCI bits of the first priority comprise one or more encoded UCI bits of a first type;
the one or more encoded UCI bits of the second priority comprise one or more encoded UCI bits of a second type; and
the first priority is a higher priority than the second priority.

15. The apparatus of claim 13, wherein the code is executable by the at least one processor to cause the apparatus to receive an indication from a network entity of a quantization granularity for the quantized payload size.

16. The apparatus of claim 13, wherein the code is executable by the at least one processor to cause the apparatus to round up an actual payload size of the one or more encoded UCI bits of the second priority to the quantized payload size.

17. The apparatus of claim 13, wherein the code is executable by the at least one processor to cause the apparatus to map the one or more encoded UCI bits of the first priority to frequency distributed REs of the PUCCH resource.

18. The apparatus of claim 17, wherein the code is executable by the at least one processor to cause the apparatus to determine a frequency distance between each of the frequency distributed REs mapped to the one or more encoded UCI bits of the first priority based on the quantized payload size of the one or more encoded UCI bits of the second priority.

19. The apparatus of claim 13, wherein the mapping of the one or more encoded UCI bits of the second priority to the first number of REs in the PUCCH resources comprises mapping the one or more encoded UCI bits of the second priority to remaining REs in the PUCCH resource after the mapping of the one or more encoded UCI bits of the first priority to the second number of REs.

20. The apparatus of claim 19, wherein the code is executable by the at least one processor to cause the apparatus to perform coding and rate matching for the one or more encoded UCI bits of the second priority using all remaining REs in the PUCCH resource.

21. The apparatus of claim 13, wherein the one or more encoded UCI bits of the first priority comprise one or more encoded hybrid automatic repeat request (HARQ) feedback bits of the first priority and the one or more encoded UCI bits of the second priority comprises one or more encoded HARQ feedback bits of the second priority.

22. The apparatus of claim 13, wherein the first priority is based on a first type of traffic or a first type of channel, and wherein the second priority is based on a second type of traffic or a second type of channel.

23. The apparatus of claim 13, wherein the PUCCH resource comprises a PUCCH format 2.

24. The apparatus of claim 13, wherein the mapping of the one or more encoded UCI bits of the second priority and the mapping of the one or more encoded UCI bits of the first priority each comprises mapping the respective one or more encoded UCI bits tone by tone starting from a lowest tone index in an earliest orthogonal frequency division multiplexing (OFDM) symbol of the PUCCH resource.

25. A non-transitory computer readable medium comprising computer executable code stored thereon for wireless communication by a user equipment (UE), the computer executable code comprising:

code for obtaining encoded uplink control information (UCI) bits comprising one or more encoded UCI bits of a first priority and one or more encoded UCI bits of a second priority, wherein the second priority is different than the first priority;

code for determining a total number of resource blocks (RBs) to transmit the encoded UCI bits, wherein the determination is based on a quantized payload size of the one or more encoded UCI bits of the second priority and a non-quantized payload size of the one or more encoded UCI bits of the first priority;

code for mapping the one or more encoded UCI bits of the second priority to a first number of resource elements (REs), in a physical uplink control channel (PUCCH) resource, associated with the quantized payload size;

code for mapping the one or more encoded UCI bits of the first priority to a second number of REs in the PUCCH resource; and code for transmitting the one or more encoded UCI bits of the second priority in the first number of REs in the PUCCH resource and the one or more encoded UCI bits of the first priority in the second number of REs in the PUCCH resource.

26. The non-transitory computer readable medium of claim 25, wherein:
the one or more encoded UCI bits of the first priority comprise one or more encoded UCI bits of a first type;
the one or more encoded UCI bits of the second priority comprise one or more encoded UCI bits of a second type; and
the first priority is a higher priority than the second priority.

27. The non-transitory computer readable medium of claim 25, further comprising code for receiving an indication from a network entity of a quantization granularity for the quantized payload size.

28. The non-transitory computer readable medium of claim 25, further comprising code for determining the quantized payload size of the one or more encoded UCI bits of the second priority, wherein the determining the quantized payload size includes rounding up an actual payload size of the one or more encoded UCI bits of the second priority to the quantized payload size.

29. The non-transitory computer readable medium of claim 25, wherein the mapping of the one or more encoded UCI bits of the first priority comprises mapping the one or more encoded UCI bits of the first priority to frequency distributed REs of the PUCCH resource.

30. The non-transitory computer readable medium of claim 29, further comprising code for determining a frequency distance between each of the frequency distributed REs mapped to the one or more encoded UCI bits of the first priority based on the quantized payload size of the one or more encoded UCI bits of the second priority.

* * * * *